(12) United States Patent
McNair

(10) Patent No.: US 11,599,953 B1
(45) Date of Patent: Mar. 7, 2023

(54) INSURANCE RISK SCORING BASED ON CREDIT UTILIZATION RATIO

(71) Applicant: CERNER INNOVATION, INC., Kansas City, KS (US)

(72) Inventor: Douglas S. McNair, Seattle, WA (US)

(73) Assignee: Cerner Innovation, Inc., North Kansas City, MO (US)

( * ) Notice: Subject to any disclaimer, the term of this patent is extended or adjusted under 35 U.S.C. 154(b) by 0 days.

(21) Appl. No.: 17/509,571

(22) Filed: Oct. 25, 2021

Related U.S. Application Data

(63) Continuation of application No. 16/718,884, filed on Dec. 18, 2019, now Pat. No. 11,158,005, which is a
(Continued)

(51) Int. Cl.
*G06Q 40/00* (2012.01)
*G06Q 40/08* (2012.01)
*G06Q 40/02* (2023.01)

(52) U.S. Cl.
CPC .......... *G06Q 40/08* (2013.01); *G06Q 40/025* (2013.01)

(58) Field of Classification Search
CPC .................................................. G06Q 40/08
See application file for complete search history.

(56) References Cited

U.S. PATENT DOCUMENTS

| | | | |
|---|---|---|---|
| 7,100,199 B2 * | 8/2006 | Ginter ................... | G06Q 20/10 380/231 |
| 9,870,589 B1 * | 1/2018 | Arnold ................. | G06Q 40/025 |

(Continued)

FOREIGN PATENT DOCUMENTS

KR    20090006489    *   7/2007   .......... G06Q 40/025

OTHER PUBLICATIONS

Problems with scoring methods and ordinal scales in risk assessment. Published in: IBM Journal of Research and Development (vol. 54, Issue: 3, pp. 2:1-2:10) Authors: D. Hubbard • D. Evans (Year: 2010).*

(Continued)

*Primary Examiner* — Bruce I Ebersman
*Assistant Examiner* — John A Anderson
(74) *Attorney, Agent, or Firm* — Kilpatrick Townsend & Stockton LLP

(57) ABSTRACT

Systems and methods are provided for the problem of automatic, algorithm-guided estimation of insurance loss ratio, claims frequency, the probability of excess claims, and other insurance policy performance characteristics for an individual insured or for groups of insured individuals. A time-series-derived Bayesian power spectrum weight is calculated from the frequency of temporal pattern-specific values in terms of intensities at various frequencies of the power spectrum computed from credit utilization ratio (CUR; outstanding balance of debt, as a percentage of credit line available) time-series obtained by the insurer by 'soft pull' inquiries submitted periodically to credit-rating agencies, and provides an opportunity to capture and measure the relative magnitude of frequent or unexpected changes in consumer liquidity. The present technology provides a system and method for classifying insurance risk, for insurance risk scoring, or for incorporating a power-spectrum-based temporal pattern-specific weight into an actuarial method to enhance the loss ratio estimation accuracy and statistical financial performance of insurance products and health plans.

20 Claims, 18 Drawing Sheets

Related U.S. Application Data continuation of application No. 14/839,168, filed on Aug. 28, 2015, now Pat. No. 10,572,945.

(60) Provisional application No. 62/043,032, filed on Aug. 28, 2014.

(56) References Cited

U.S. PATENT DOCUMENTS

| | | | |
|---|---|---|---|
| 10,249,385 B1 | 4/2019 | McNair et al. | |
| 10,572,945 B1 | 2/2020 | McNair | |
| 11,158,005 B1 | 10/2021 | McNair | |
| 2008/0312969 A1* | 12/2008 | Raines | G06Q 10/10 |
| | | | 705/4 |
| 2010/0235285 A1 | 9/2010 | Hoffberg | |
| 2018/0049043 A1* | 2/2018 | Hoffberg | G06Q 10/0635 |

OTHER PUBLICATIONS

Revealing Key Non-financial Factors for Online Credit-Scoring in e-Financing Published in: 2013 10th International Conference on Service Systems and Service Management (pp. 547-552) Authors: Ying Wang • Siming Li • Zhangxi Lin (Year: 2013).*

Iyer et al., "Automated Risk Classification and Outlier Detection", Proceedings of the 2007 IEEE Symposium on Computational Intelligence in Multicriteria Decision Making, 2007, pp. 272-279.

Koopmeiners et al., "Modeling and Detecting Potentially Ruinous Streaks in Health Expenditures", International Journal of Health Care Finance and Economics, vol. 7, No. 1, Mar. 10, 2007, pp. 23-42.

"The Comprehensive R Archive Network", R, Available online at: <http://cran.r-project.org>, Retrieved on Feb. 27, 2020, 1 page.

* cited by examiner

SCALED MEDIAN POSTERIOR BAYESIAN LIKELIHOOD = 6.3E-01
EXCESS CLAIMS IN SUBSEQUENT 12 MONTHS: NO

TIME SERIES

AUTOCORRELATION

BAYESIAN POWER SPECTRUM

SCALED MEDIAN POSTERIOR BAYESIAN LIKELIHOOD = 1.5E-19
EXCESS CLAIMS IN SUBSEQUENT 12 MONTHS: YES

TIME SERIES

AUTOCORRELATION

BAYESIAN POWER SPECTRUM

SCALED MEDIAN POSTERIOR BAYESIAN LIKELIHOOD = 1.7E-24
EXCESS CLAIMS IN SUBSEQUENT 12 MONTHS: YES

TIME SERIES

AUTOCORRELATION

BAYESIAN POWER SPECTRUM

SCALED MEDIAN POSTERIOR BAYESIAN LIKELIHOOD = 5.8E-23
EXCESS CLAIMS IN SUBSEQUENT 12 MONTHS: YES

TIME SERIES

AUTOCORRELATION

BAYESIAN POWER SPECTRUM

SCALED MEDIAN POSTERIOR BAYESIAN LIKELIHOOD = 4.8E-05
EXCESS CLAIMS IN SUBSEQUENT 12 MONTHS: NO

TIME SERIES

AUTOCORRELATION

BAYESIAN POWER SPECTRUM

SCALED MEDIAN POSTERIOR BAYESIAN LIKELIHOOD = 5.1E-05
EXCESS CLAIMS IN SUBSEQUENT 12 MONTHS: NO

TIME SERIES

AUTOCORRELATION

BAYESIAN POWER SPECTRUM

SCALED MEDIAN POSTERIOR BAYESIAN LIKELIHOOD = 8.4E-14
EXCESS CLAIMS IN SUBSEQUENT 12 MONTHS: NO

TIME SERIES

AUTOCORRELATION

BAYESIAN POWER SPECTRUM

|  | >90$^{TH}$ PCTILE CLAIMS | ≤90$^{TH}$ |
|---|---|---|
| PREDICT >90$^{TH}$ | 85 | 21 |
| PREDICT ≤90$^{TH}$ | 7 | 879 |

SENSITIVITY: 92%
SPECIFICITY: 98%

*FIG. 14.*

```

# CERDSM - 10-JUL-2014 - Bayesian Power Spectra of credit utilization ratio time
series for insurance risk scoring library("bspec")
library("zoo")

# init
set.seed(1239)
pmed <<- 0  # global var load data
cur <- read.csv(file="c:/0_cerdsm/IP/credit_utilization/cur.csv", header=TRUE)

# inspect timeseries
plot(1:24,cur$cur1, type="l", col="red", lwd=3, xlab="Month", ylab="CUR%",
ylim=c(0,100))

# assemble the timeseries of current covered's credit utilization ratio values and
# those of comparables matched on basis characteristics
ts <- ts(cur$cur1, deltat=1, start=0)
ts.spec2 <- bspec(ts, sample(ts), priordf=2, priorscale=0.6, intercept=FALSE)

# plot autocorrelogram and Bayesian power spectrum
str(acf(ts.spec2))
plot(acf(ts.spec2), col="red", lwd=3)
plot(ts.spec2, col="red", lwd=3)
lines(ts.spec2$freq, sample(ts.spec2), type="b", pch=20, col="red", lwd=3)

# pmd fn to find median posterior from 500 iterations of Bayes sampler... 500 is
stable at 1.5 significant digits mantissa
pmd <- function(v) {
 pmed <<- 0
 at1 <- as.ts(v, deltat=1, start=0)
 as1 <- bspec(at1, priordf=2, priorscale=0.6, intercept=FALSE)
 for (i in 1:500) {
  ps1 <- sample(as1)
  # compare spectrum to posterior permuted sample
  rawp <- likelihood(as1, ps1)
  # apply Bonferroni correction
  p <- length(as1)*rawp
  pmed <<- c(pmed, p)
 }
 pmed <<- median(pmed)
 # transform to scale on [0,1)
 pmed <- 2*asin(sqrt(min(4.2e-04,pmed)/4.2e-04))/pi
 return (pmed)
} calculate scaled median posterior likelihood
pmd(cur$cur1)
```

*FIG. 15.*

```
library(copula)
library(MASS)
library(mvtnorm)
library(VineCopula)
library(CopulaRegression)
library(scatterplot3d)
library(multinbmod)

# Kraemer N, et al. Total loss estimation using copula-based regression models.
Insurance Math Econ 2013;53:829-39.
# assume every covered has at least one claim per year related to employer-
required wellness checkup
otherwise use zero-inflated model or negative-binomial set.seed(1239)

number of examples
n <- 200 simulate data
clayton.cop <- claytonCopula(2, dim=2)
# dat <- rCopula(n, clayton.cop)
gumbel.cop <- gumbelCopula(2, dim=2)
dat <- rCopula(n, gumbel.cop)

# transform to integer counts
dat[,2] <- round(23*dat[,2],0)

# floating_point var and Poisson integer_count var
x <- dat[,1]
# integer_var
y <- dat[,2]

loss <- data.frame(score=x, claims=y)
write.csv(loss, file="c:/0_cerdsm/IP/habitat_copula/loss.csv")

loss <- read.csv(file="c:/0_cerdsm/IP/habitat_copula/loss.csv", header=TRUE,
        colClasses=c("numeric","integer"))

R <- cbind(rep(1,n),rnorm(n))
S <- cbind(rep(1,n),rnorm(n))

# regression coefficients
alpha <- c(1,1)
beta <- c(1,1)

# constant exposure
exposure <- rep(1,n)

# dispersion parameter
delta <- 0.5
```

*FIG. 16A.*

CONTINUES TO FIG. 16B

CONTINUES FROM FIG. 16A

```
# Kendall's tau
tau <- 0.3 copula family   1 = Gauss, 3 = Clayton, 4=Gumbel, 5=Frank
family <- 4 joint model without standard errors
fit <- copreg(loss$score, loss$claims, R, S, family, exposure, FALSE, TRUE)
fit
# $alpha
#          R1           R2
# -0.682949890  0.003680888

# $beta
#          S1           S2
#  2.23389807  -0.06342086

# $delta
#  0.580426

# $theta
#  1.000000

# $tau
7.976464e-08 fit2 <- glm(claims ~ score, family=quasipoisson(), data=loss)
summary(fit2)
dispersion ~ 2.89 >> 1.00 so overdispersion exists in data fit3 <- multinbmod(claims ~ score, data=loss, id=factor(seq(1:200)))
summary(fit3)

# predict
out <- predict(fit, R, S)
out out2 <- predict(fit2, data.frame(score=seq(0, 1, 0.02)))
out2 there is no predict() fn for neg binomial regr
out3 <- predict(fit3, data.frame(score=seq(0, 1, 0.02)))
out3 plots
plot(c(0,1), c(0,25), type="n", xlab="score", ylab="N(claims)", col="red", lwd=3)
x <- seq(0, 1, 0.02)
lines(x, predict(fit2, data.frame(score=x), type="response", col="red", lwd=3))
points(loss$score, out2$y.pred, type="p", col="red", cex=2, lwd=3)
```

FIG. 16B.

CONTINUES TO FIG. 16C

CONTINUES FROM FIG. 16B

```
plot(loss, type="p", col="red", cex=2, lwd=3)
plot(x, out$y.pred, type="p", cex=2, col="red", lwd=3)
plot(x, abs(y - out$y.pred), type="p", cex=2, col="red", lwd=3)

# x1 <- rlnorm(n, 3.22, 0.56)
# x1 <- x1/max(x1)
# y1 <- rep(0, n)

# for (i in 1:n){
#   y1[i] <- sample(rbinom(200, round(34*x1[i],0), 0.4), 1)
# }
# plot(x1, y1, type="p", col="red", cex=2, lwd=3)
# loss <- data.frame(score=x1, loss=y1)
# write.csv(loss, file="c:/0_cerdsm/IP/habitat_copula/loss.csv")

loss <- read.csv(file="c:/0_cerdsm/IP/habitat_copula/loss.csv", header=TRUE,
       colClasses=c("numeric","integer"))

fit2 <- ztp.glm(y, S, exposure=exposure, TRUE)
fit2 quantile of loss
mu <- 1000
lambda <- 2.5
theta <- BiCopTau2Par(tau=tau, family=family)
theta
# quantiles
q95 <- qpolicy_loss(0.95, mu, delta, lambda, theta, family)
q75 <- qpolicy_loss(0.75, mu, delta, lambda, theta, family)
q50 <- qpolicy_loss(0.50, mu, delta, lambda, theta, family)
q25 <- qpolicy_loss(0.25, mu, delta, lambda, theta, family)
q05 <- qpolicy_loss(0.05, mu, delta, lambda, theta, family)
```

*FIG. 16C.*

INSURANCE RISK SCORING BASED ON CREDIT UTILIZATION RATIO

CROSS-REFERENCE TO RELATED APPLICATIONS

This application is a continuation of U.S. patent application Ser. No. 16/718,884, titled "Insurance Risk Scoring Based On Credit Utilization Ratio," filed Dec. 18, 2019, which is a continuation of U.S. patent application Ser. No. 14/839,168, titled "Insurance Risk Scoring Based On Credit Utilization Ratio," filed Aug. 28, 2015, which claims the benefit of U.S. Provisional Application No. 62/043,032, titled "Insurance Risk Scoring Based On Credit Utilization Ratio," filed Aug. 28, 2014, each of which is hereby expressly incorporated by reference in its entirety.

INTRODUCTION

Insurance Risk Scores are typically based exclusively on objective, factual credit report information, including consumer accounts such as credit cards, retail store cards, mortgages, and auto loans. Also included in typical insurance risk scores is public record information, including bankruptcies, liens and judgments, and collection accounts. Additionally, Insurance Risk Scores take into consideration consumer-initiated "hard pull" inquiries associated with their requests for new or increased lines of credit. Multiple consumer-generated "hard pull" credit inquiries associated with the shopping for a mortgage or auto loan are de-duplicated on a time horizon of 14 days, to minimize the impact on their score. All of this factual credit information is received by credit rating agencies such as Equifax, TransUnion, Experian, and FICO from tens of thousands of financial institutions, retailers, and court houses on a monthly basis. Typically consumer credit reports and the calculation of a consumer's Insurance Risk Score do not include medical history and records, consumer buying habits, checking and savings information, income, and prohibited basis characteristics identified by the Comptroller of the Currency, which includes information regarding marital status, race, age, religion, family status, color, receipt of public assistance, disability, gender, or national origin. To date, no basis characteristic related to patterns of credit utilization ratio are known to have been prohibited.

In their underwriting and pricing process, insurers seek to charge rates that are equitable, adequate and not unfairly discriminatory. These objectives are sometimes difficult to achieve because of regulatory constraints and insurers' own desires not to discriminate unfairly or act in a manner that is inconsistent with socially acceptable standards. From the company perspective, pricing equity and accurate cost projections are crucial. Credit data can be used to create scores that in fact provide additional predictive information about future losses. However, using credit history is often perceived to be in conflict with what society considers as fair, particularly if the individual's score is affected by catastrophic events such as divorce, medical problems or loss of a job.

More than 90 percent of insurers responding (from the top 100 personal lines companies) indicated in an American Academy of Actuaries survey that they currently use credit report data in their auto and property and casualty (non-health) insurance underwriting operations. Ten percent use it for pricing only; 38 percent for underwriting only, and 52 percent for underwriting and pricing. Fourteen percent use credit history on annual renewal; 33 percent use such data during re-underwriting, and 38 percent claim not to use credit report data at all in the renewal process. However, medical insurance underwriting does not typically include credit report data.

The use of credit data in underwriting and pricing of personal automobile insurance has sparked an intense debate that centers mostly on the following factors relating to statistical correlation between credit data and loss ratio: (1) benefits to consumers, (2) discrimination, and (3) socially acceptable criteria. There are several published studies that show a statistically significant relationship between credit data and loss ratio performance. These studies show that this correlation can change in time—but this correlation, however strong, cannot establish a causal relationship. The use of credit data has allowed insurers to establish that some insured individuals, traditionally classified as "standard," can qualify as "preferred" when evaluated by these models. Studies have shown that even insured individuals with prior violations or accidents but having good credit behavior can have better loss ratio performance than insured individuals who have no accidents or violations but who have poor credit.

In the U.S., most state insurance laws prohibit the use of insurance rates that are excessive, inadequate, or unfairly discriminatory. Principle 4 of the Casualty Actuarial Society's Statement of Principles Regarding Property and Casualty Insurance Ratemaking states that, "A rate is reasonable and not excessive, inadequate, or unfairly discriminatory if it is an actuarially sound estimate of the expected value of all future costs associated with an individual risk transfer." Thus, the overall average rate level should be set so that the total premium collected from all risks is sufficient to cover the total expected costs. Additionally, the individuals' rates should be set such that the premium collected from each individual risk, or group of similar risks, accurately reflects the expected costs for that individual risk (or group of similar risks).

The use of credit data in decision-making, along with having more easily accessible and reliable data, has led to the rapid growth in automated underwriting systems that minimize subjective judgment by relying on more objective, rigorous, data-driven decision processes. Automated systems are more predictive, reliable and can improve the integrity of risk classification systems. The federal Fair Credit Reporting Act (FCRA), 15 U.S.C. § 1681 et seq. regulates the consumer reporting industry in the U.S., including firms that furnish data to and use data from consumer reporting agencies. Comprehensive changes to the FCRA were enacted in 2003 when Congress passed the Fair and Accurate Credit Transactions Act of 2003 (FACTA or FACT Act). The FCRA controls the intake and output of consumer reporting data. Many states also have their own credit reporting laws.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Systems, methods, and computer-readable media are provided for the field of insurance underwriting, pricing, and loss ratio estimation. Time series are formed by (a) retrieving an insured individual's credit utilization ratio (CUR) periodically via 'soft pull' inquiries submitted to credit rating agencies, (b) calculating Bayesian power spectra for each time series formed from a plurality of such time-stamped CUR values, (c) repeatedly randomly sampling the spectra to calculate the median likelihood for each, with Bonferroni or other suitable correction for timeseries length, (d) scaling the median likelihood values so as to be on a scale that is commensurate with the weights calculated by conventional insurance risk scoring, (e) combining each scaled median likelihood with the corresponding conventional actuarial models and basis characteristics, and (g) optionally, rank-ordering the resulting set according to the scores to predict which historical loss patterns most closely resembles the current spectral characteristics of the insured. Insolvency (liquidity, leverage, default risk) represents an instantaneous hazard; as soon as liquidity is restored, default risk abates. But insurance risk effects of financial distress, like health effects are likely to accrue over time, much as occurs with exposure to tobacco or alcohol. Cessation of the exposure does not restore risk to baseline. The system and method of the present technology allow a system to assess the effect of frequent or unexpected changes in an insured individual's liquidity on physical or psychological stress that may contribute to the insured individual's health issues, health services utilization, and insurance claims. This is likely to be an effective means of mitigating inaccuracies in estimating the loss ratio.

An embodiment determines a measure of financial stress, and uses this measure in conjunction with actuarial methods. An embodiment performs credit rating agency "soft pull" inquiries, which may be submitted bi-weekly or monthly, for each insured plan member or policy holder. The impact of frequent or unexpected changes in consumer liquidity on health utilization claims is captured and measured. These frequent or unexpected changes are likely related to stresses experienced by the insured. A credit utilization ratio (CUR), which may be determined as a time-series of outstanding balance of debt as a percentage of credit line available, is used to calculate a Bayesian power spectrum. The CUR enhances estimation accuracy of insurance loss ratio, claims frequency, and probability of excess claims. Further, it augments insurance policy performance characteristics for an individual or for groups of insured individuals.

BRIEF DESCRIPTION OF THE DRAWINGS

Embodiments are described in detail below with reference to the attached drawing figures, wherein:

FIG. 14 depicts a display providing a table showing the statistical performance of an embodiment;

FIG. 15 illustratively provides an example embodiment of a computer program routine for determining a risk category from a credit utilization time series; and FIG. 16A-16C illustratively provide an example embodiment of a computer program routine for estimating total loss for a risk scoring method using a regression model.

DETAILED DESCRIPTION

Figure 1:
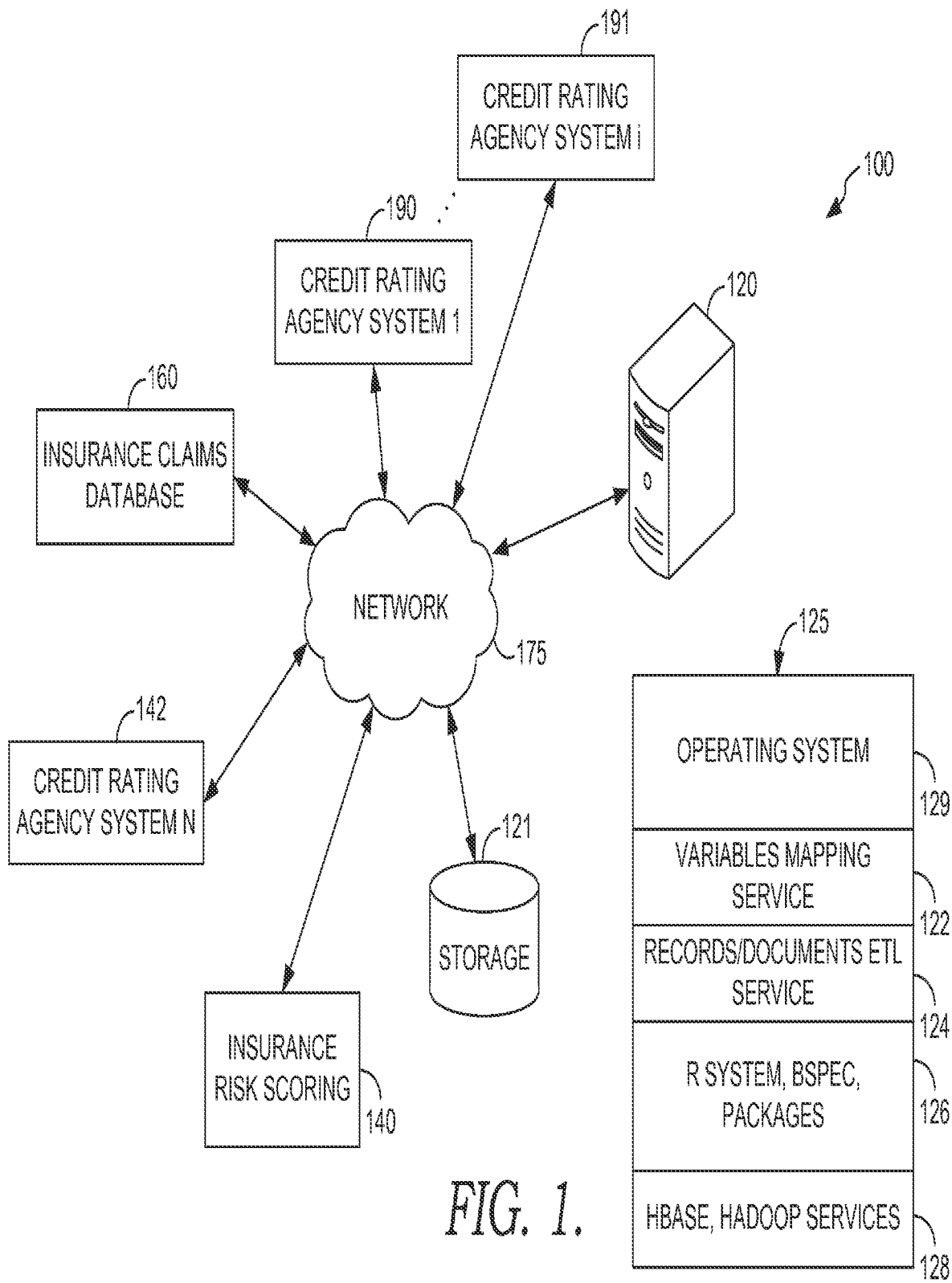
FIG. 1 depicts aspects of an operating system environment suitable for practicing an embodiment of the invention.

The subject matter of the present invention is described with specificity herein to meet statutory requirements. However, the description itself is not intended to limit the scope of this patent. Rather, the inventor has contemplated that claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of the invention may be embodied as, among other things, a method, system, or set of instructions embodied on one or more computer-readable media. Accordingly, the embodiments may take the form of a hardware embodiment, a software embodiment, or an embodiment combining software and hardware. In an embodiment, the invention takes the form of a computer-program product that includes computer-usable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information, including computer storage media and communications media. Examples of stored information include computer-useable instructions, data structures, program modules, and other data representations. Computer storage media examples include, but are not limited to, information-delivery media, RAM, ROM, EEPROM, flash memory or other memory technology, CD-ROM, digital versatile discs (DVDs), holographic media or other optical disc storage, magnetic cassettes, magnetic tape, magnetic disk storage, other magnetic storage devices, and other computer hardware or storage devices. These technologies can store data momentarily, temporarily, or permanently.

As described herein, embodiments of the invention are directed to enabling improvements in loss ratio estimation in insurance underwriting and pricing, in particular in health insurance. A recent concern regarding credit-based scoring systems, in particular insurance risk models derived from them, is that proactive actions taken by lenders to reduce potential losses by lowering revolving credit limits. Some contend that this might spuriously lower a consumer's Insurance Risk Score, penalizing consumers in the form of higher premiums and less favorable coverage. In addition, a majority of the credit characteristics calculate credit utilization as a function of a consumer's revolving credit limits combined with original installment loan amounts. This different approach dilutes the potential impact associated with the lowering of revolving credit limits.

Various credit parameters, ranging from less severe (payments more than 60 days delinquent) to more severe (bankruptcy), may be included in data that are available from secondary sources. Based on these parameters, if a key measure of credit quality is having a debt payment that is 60 days or more past due, then the use of credit characteristics may have a disparate impact on lower income households. Empirical evidence from individual experience may confirm this.

It is a common misconception that during a recession virtually every consumer's credit score (and, hence, Insurance Risk Score) will decline. Examining recession-associated changes is instructive in that it reveals how the predictive ability of credit-based Insurance Risk Scores is preserved even in the case when almost 100 percent of the population experiences a decline in their Credit Risk Score. Statistically, such a shift in the entire population would likely have little impact on insurance rates (except to the extent that actual loss performance deteriorates), since the Insurance Risk Scores differentiate risk among groups with varying degrees of loss expectancy. These groupings would still exist as would the ability of insurers to differentiate between them statistically even if a bad economy caused the credit and insurance scores of every member of the population to decline. Conversely, an improving economy raises all credit and insurance scores, and the insurer's ability to distinguish among groups is not in any way impaired.

In an embodiment, the action of lowering revolving credit limits would not significantly affect the individual's Insurance Risk Score, insofar as the Bayesian power spectral density of the de-meaned and de-trended credit utilization ratio time series is not materially changed. Revolving credit utilization ratio characteristics are included in Credit Risk Score models, but, by themselves, they are frequently not included in the calculation of Insurance Risk Scores. Based upon empirical evidence, relatively few credit utilization characteristics, of dozens that have been tested, are found to be highly correlated to insurance loss ratio.

The role of stress is important to recognize because it is a precursor to more serious mental health conditions, to less healthful lifestyle choices and behavior, and to exacerbation of existing health conditions, resulting in worsening of insurance loss ratio and claims experience. Stress is widespread in society and in the workplace. Hundreds of research studies have examined how aspects of jobs, organizational behavior, and activities of daily living can create stress for consumers and can contribute to mental health conditions and other physical health problems.

Events in one's family can be a major source of stress that can manifest itself in the workplace. Many persons in the prime of their working years are stressed by caring for both young children and for an aging parent. Many caregivers experience significant employment-related consequences from having to balance greater amounts of time devoted to providing family support with time at work. For some people, that stressful path reaches a point where the burdens of family care and working a job can no longer both be managed.

Many of the health problems of insured individuals can be attributable to worsening public health, with poor diets, growing obesity, smoking and more sedentary lifestyles all playing a part. Some can also be explained by growing levels of workplace 'stress', personal debt, and family breakdown and their links to depressive illness. Of course, part of the solution rests with government. It must take the lead in the public health arena, encouraging and educating citizens to make healthier choices in their lives. For individuals, it means taking more proactive personal responsibility for their lifestyle choices, health and wellbeing. However, employers and insurers have a role to play too. Partly, this is accomplished by instituting certain incentives for the insured to behave in specific ways that are salutary for health. The incentives may be based on contracting by the insured to receive health promotion-related rewards or discounted insurance premia, such as for smoking cessation, weight loss, or pedometer-measured walking 10,000 steps per day.

In like fashion, with effective management various acute and chronic stressors of daily life that impose a significant burden on physical and psychological health may be reduced, averting significant adverse physiological, emotional, behavioral, and financial outcomes.

Among these, cardiovascular disease continues to be a leading cause of spending and mortality in the United States, and ischemic heart disease is the most common type of heart disease. Cardiovascular disease-related health insurance claims are therefore a convenient index of statistical relationships to stress or other factors. Established risk factors for ischemic heart disease include diabetes mellitus, disorders of lipid metabolism, high blood pressure, cigarette smoking, obesity, and physical inactivity. The role of the work environment or work climate in the development of heart disease and other health challenges is of great interest. Much of the focus is on the role of job stress, financial stress, and perceived employment insecurity, as these factors have all been shown to contribute to heart disease. However, it is difficult to devise objective and longitudinal measures of physical and psychological stressors that would be practical to use in insurance plan management, health plan management and insurance underwriting.

The epidemiological literature is replete with studies demonstrating the relationship between modifiable health risks and morbidity and mortality. However, there is less direct evidence on the association between modifiable health risks and individual health care expenditures. Recent reviews of published studies examining the financial impact of health promotion programs have concluded that there are good correlational data to suggest that high levels of stress, excessive body weight, and multiple risk factors are associated with increased health care costs and illness-related absenteeism. Recent reviews have also concluded that health promotion programs are associated with reduced health care costs.

A major step forward was taken when Goetzel and colleagues used the Health Enhancement Research Organization (HERO) database to examine the association between ten modifiable health risks and health care expenditures. The focus of this study and the central unit of analysis was the individual employee. The study sought to document increased health care expenditures associated with certain health risks at the individual level. It was found that employees at high risk for poor health outcomes had significantly higher expenditures than did employees at lower risk in seven of ten risk categories: those who reported themselves as depressed (70% higher expenditures), at high stress (46%), with high blood glucose levels (35%), at extremely high or low body weight (21%), with high blood pressure (12%), and with a sedentary lifestyle (10%). Employees with multiple risk profiles for specific disease outcomes had higher expenditures than did those without these profiles for the following diseases: heart disease (228% higher expenditures), psychosocial problems (147%), and stroke (85%). Researchers have concluded that stress and other common modifiable health risks are associated with increases in the likelihood of incurring health expenditures and in the magnitude of those expenditures.

Productivity and health have been important themes in job stress research for several decades. Some researchers have called for "new models" to help stress and productivity. A prominent argument of research using models of job strain is that traditional bureaucratic and Frederic Taylor-esque (i.e., 'scientific management') work organization and management principles stifle the full use of human capital. It is crucial, therefore, that workers and employers find the optimal balance between job demands and high decision making autonomy so that the goals of individual well-being and productivity can be achieved and sustained.

There is abundant evidence that working conditions in which workers experience a combination of high job demands and low decision making latitude are associated with a range of psychological and physical health problems. The 'demand-control' model of stress has been used to predict the risk of heart disease, depression, and other illnesses for which lost productivity costs and increased insurance claims can be calculated. These relationships are stronger if workers participate in the design and implementation process.

In terms of effective interventions, research suggests that lifestyle and work redesigns that afford greater autonomy and decision-making authority, more skill discretion, more social supports, and decreased physical and psychological demands are associated with better health, lower health services utilization, and fewer medical insurance claims.

A number of studies suggest that the impact of debt on mental health may be mediated by personal attitudes towards debt, or more specifically 'debt worry'. It is possible, for example, that participants' attitudes towards debt as recorded in the studies also reflect other personal concerns or variables that may not be measured by a study (for example, current income, expected future income, family financial situation). Where unmeasured, or not controlled for, these variables may also impact on measures of a person's mental health or psychological wellbeing. Similarly, anxiety about debt might reflect a person's general anxiety or psychological outlook. People who score higher on measures of anxiety or depression might be more likely to have a negative view of their finances. Although studies indicate a correlation between actual debts and debt worries, there is also evidence that the relationship between the two is more complex, and may additionally be affected by other factors.

Credit-based Insurance Risk Scores and Credit Risk Scores are not identical. Credit Risk Scores are designed to predict the likelihood of individual default risk, while Insurance Risk Scores are designed to predict claims loss ratio. Credit Risk Scores are generally more volatile because they tend to rely more upon various forms of revolving credit utilization, including recent new account openings and recent account delinquencies, than Insurance Risk Scores. Although different aspects of utilization, account openings, and delinquency are contained within Insurance Risk Scores, these credit characteristics are defined differently and are not weighted as heavily as they are in Credit Risk Scores. Prior art Insurance Risk Scores, when compared to Credit Risk Scores, tend to place more emphasis on credit characteristics that demonstrate a consumer's depth of credit history as reflected by the number and type of accounts maintained over time and a longer-term view of account delinquency likelihood.

Recent results show that borrowers who experience a decline of 10% in their FICO score (credit quality) after insurance coverage origination increase their credit line utilization by 15.5%. The present technology augments these tendencies by incorporating basis characteristics of credit utilization ratio time series Bayesian power spectral density.

For individuals as well as businesses, one of the most commonly used measures is the "current ratio." The current ratio measures financial liquidity, the extent to which current liabilities are covered by current assets, calculated by dividing current assets by current liabilities. The current ratio is the most commonly used measure of short-term solvency.

Debt management ratios measure the extent to which an entity is using debt financing, or financial leverage. Debt management ratios denote the degree of risk or safety afforded to creditors. The debt ratio, or ratio of total debt to total assets, measures the percentage of funds provided by creditors. Total debt includes both current liabilities and long-term debt. The lower the ratio, the greater the protection afforded creditors in the event of liquidation. A debt ratio that exceeds the industry average raises a red flag and may make it costly for an entity to borrow additional funds without first raising more equity capital.

If the entity earns more on investments financed with borrowed funds than it pays in interest, the return on the owners' capital is magnified, or "leveraged." Entities with relatively high debt ratios have higher expected returns when the economy is normal, but they are exposed to risk of loss when the economy goes into a recession. Entities with low debt ratios are less risky, but also forgo the opportunity to leverage up their return on equity. For public businesses, analysts use two procedures to examine the entity's debt: (1) They check the balance sheet to determine the extent to which borrowed funds have been used to finance productive assets as contrasted with covering operating expenses, and (2) they review the income statement to see the extent to which fixed charges are covered by operating profits. Neither procedure is readily accomplished for entities who are private individuals.

The credit utilization ratio also measures solvency and leverage. Based on data from credit bureaus and credit card issuers, several investigators have recently found negative correlation between the credit utilization ratio and Credit Risk Score that is even stronger than the correlation between credit limit and Credit Risk Score: low-score consumers have much higher credit utilization rates than those with higher scores. Causality for this relation may run the other way as well: high credit card utilization rates may cause low Credit Risk Scores over time. Nevertheless, this finding—that consumers with higher credit utilization rates used debit cards more frequently—could imply that consumers with a lower credit score experience lasting credit limitations—due to lower credit limits, or greater liquidity needs in the past, or both.

Other attempts or efforts are deficient due to:

(1) Omission of basis characteristics that objectively quantify stress experienced by the insured over time.

(2) Excessive false-negative rate (financial loss for the insurer; adverse selection; negative percentage error of actual compared to estimated or budgeted amount, covered by contracted premium payments).

(3) Excessive false-positive rate (financial gain for the insurer; positive percentage error of actual compared to estimated or budgeted amount, covered by contracted premium payments). False-positive errors lead to premium price-setting at a higher level than would have been necessary to insure plan solvency, causing the cost to the insured to be higher.

(4) Heteroskedasticity (scale-dependent variance) of credit utilization ratio and other raw measures of the insured's liquidity, such that use of standard deviation, median absolute deviation from the median, or other measures of dispersion have, in general, low predictive accuracy and precision in regard to estimating future insurance loss ratio, claims incidence, or services utilization intensity.

(5) Many potentially relevant variables that have strong statistical associations with health insurance loss ratio are proscribed by law and/or the Comptroller of the Currency in U.S. (and may be similar in other jurisdictions), e.g. Medical history and records; Consumer buying habits; Bank checking and savings account information; Income; Marital status; family status; Race, age, religion, receipt of public assistance, disability, gender, national origins.

(6) Metrics drawn from a covered individual's self-reported data may have deficiencies in some circumstances, such as being subjective; impractical to solicit as a self-report very frequently (e.g. more than twice per year), propensity for bias, non-reporting, or fraudulent reporting, leading to 'adverse selection'.

(7) Failure of conventional insurance risk scoring variables to discover the detailed multi-scale dynamics of the physical and psychologic sequellae of stress and their impact on health services utilization over time.

An embodiment establishes a method for ameliorating these limitations and providing objective, quantitative means for predicting the loss ratio. In particular, a method is employed that accurately characterizes physical and psychological stress associated with frequent or unexpected changes in financial liquidity.

Turning now to FIG. 1, there is presented an example operating environment 100 suitable for practicing an embodiment. Example operating environment 100 includes a computerized system for compiling and/or running an embodiment of an information architecture that performs decision support recommendation service. With reference to FIG. 1, an Electronic Insurance Record (EIR) system, such as agency EIR system 160 containing an insurance claims database, is communicatively coupled to network 175, which is communicatively coupled to computer system 120. In an embodiment, components of operating environment 100 that are shown as distinct components may be embodied as part of or within other components of environment 100. For example, an EIR system 160 may be implemented in computer system 120. Similarly, a single EIR system may perform functions for one or more remote EIR systems (not shown).

In an embodiment, network 175 includes the Internet and/or one or more public networks, private networks, other communications networks such as a cellular network, or similar network(s) for facilitating communication among devices connected through the network. Network 175 may be determined based on factors such as the source and destination of the information communicated over network 175, the path between the source and destination, or the nature of the information. For example, intra-organization or internal communication may use a private network or virtual private network (VPN). Moreover, in some embodiments, items shown communicatively coupled to network 175 may be directly communicatively coupled to other items shown communicatively coupled to network 175.

In an embodiment, operating environment 100 may include a firewall (not shown) between a first component and network 175. In such an embodiment, the firewall may reside on a second component located between the first component and network 175, such as on a server (not shown), or reside on another component within network 175, or may reside on or as part of the first component.

An embodiment of electronic insurance record (EIR) system 160 includes one or more data stores of insurance claims records, which may be stored on storage 121, and may further include one or more computers or servers that facilitate the storing and retrieval of the claims records. In an embodiment, an EIR system 160 is implemented as a cloud-based platform or is distributed across multiple physical locations. EIR system 160 may further include record systems, which store real-time or near-real-time user information, such as purchasing information, loyalty card information, or health record information indicative of insurance claims.

Although FIG. 1 depicts an exemplary EIR system 160, it is contemplated that an embodiment relies on other servers (not shown) that provide purchasing information service, loyalty card information or health record information from an Electronic health record System.

Example operating environment 100 further includes risk analyst system 140 including an Insurance Risk Scoring program and user interface. System 140 is communicatively coupled to an EIR system 160. Although environment 100 depicts an indirect communicative coupling between system 140 and EIR system 160 through network 175, it is contemplated that an embodiment of system 140 is communicatively coupled to EIR system 160 directly. Example operating environment 100 further includes computer system 120, which may take the form of a server, which is communicatively coupled through network 175 to EIR system 160, storage 121, and system 140.

An embodiment of system 140 includes a user interface operated by a software application or set of applications on a client computing device such as a personal computer, laptop, smartphone, or tablet computing device. In an embodiment, the application includes Risk Analysis and classification system reporting insurance risk through a screen display to a user who operates system 140. In an embodiment, the application is a Web-based application or applet. A user application facilitates accessing and receiving information from a user, server or EIR system 160 about a specific patient or set of patients for which Insurance Risk is to be evaluated and the application displays results, recommendations, prices, policies, or risk results, for example. In an embodiment, system 140 also facilitates receiving policies for an applicant from a policy generation system which may reside on system 160, for example. System 140 may be used for providing Risk Analysis information, such as the information as illustrated and discussed in connection with FIGS. 4A-14.

In an embodiment, EIR system 160 is a workstation that receives a risk indication such as a loss ratio prediction, or a loss ratio category from system 140 and EIR system 160 generates a policy and a price based on a risk indication. In an embodiment, EIR system 160 comprises an electronic display that presents the results of risk analysis to a user/analyst. In an embodiment, EIR system 160 emits an indication of an incentive program to reduce the premium for the user to present to an applicant, and provides this information in a message to the user of system 140, where system 140 is a personal communication device. In an embodiment, a personal communication device is a computer, a pager, a laptop computer, a computer workstation, a desktop computer, a tablet, a wired telephone, a wireless telephone, cellular telephone, personal digital assistant, or smartphone. In an embodiment, system 160 provides a short message service (SMS) message, email, audible tone, audible announcement, or a display message.

An embodiment of system 140 takes the form of a user interface and application, which may be embodied as a software application operating on one or more mobile computing devices, tablets, smartphones, front-end terminals in communication with back-end computing systems, laptops, or other computing devices. In an embodiment, system 140 includes a Web-based application or set of applications usable to manage user services provided by an embodiment. For example, in an embodiment, system 140 facilitates processing, interpreting, accessing, storing, retrieving, and communicating information acquired from credit rating agency systems 1 (190), i (191) or N (142).

In an embodiment, system 140 includes functionality for processing user-derived information locally or for communicating the information to computer system 120 or system 160, where it may be processed. In an embodiment, the processing may be carried out or facilitated by one or more software agents, as described below. In an embodiment, the processing functionality, which may occur on system 140, and/or computer system 120, includes signal conditioning, such as removing noise or erroneous information. In an embodiment, processing functionality is operable to process user-derived information, such as credit data derived from a soft pull from a credit rating agency from system 190. In an embodiment, a soft-pull is performed over an interval periodically, e.g. daily, weekly, bi-weekly, monthly, bi-monthly, quarterly, or yearly for an applicant and accumulated data is stored in storage 121. In an embodiment, the processing includes classifying the user-derived information acquired for a particular time interval into a category.

Computer system 120 comprises one or more processors operable to receive instructions and process them accordingly, and may be embodied as a single computing device or multiple computing devices communicatively coupled to each other. In an embodiment, processing actions performed by system 120 are distributed among multiple locations such as one or more local clients and one or more remote servers. In an embodiment, system 120 comprises one or more computing devices, such as a server, desktop computer, laptop, or tablet, cloud-computing device or distributed computing architecture, a portable computing device such as a laptop, tablet, ultra-mobile P.C., or a mobile phone.

An embodiment of computer system 120 includes computer software stack 125, which in some embodiments operates in the cloud, as a distributed system on a virtualization layer within computer system 120. An embodiment of software stack 125 includes operating system 129. Operating system 129 may be implemented as a platform in the cloud. Operating system 129 is capable of hosting a number of services such as 122, 124, 126, and 128. An embodiment of services 122, 124, 126, and 128 run as a local or distributed stack in the cloud, on one or more personal computers or servers such as system 120, and/or a computing device 140 running an insurance system risk scoring application. In an embodiment, system 140 operates in conjunction with software stack 125.

In an embodiment, variables indexing service 122 and records/documents ETL service 124 provide services that facilitate retrieving frequent item sets, extracting database records, and cleaning the values of variables in records. For example, variables mapping service 122 may perform functions for synonymic discovery, indexing or mapping variables in records, or mapping disparate record systems' ontologies, such as determining that a particular credit condition of a first record system is the same as another credit condition on a second record system. In an embodiment mapping service 122 provides service that facilitates retrieving frequent item sets, extracting database records, and cleaning values of variables in records. In an embodiment, these services may invoke software services 126. Software services 126 perform statistical software operations, and include statistical calculation packages such as, in an embodiment, the R system (the R-project for Statistical Computing, which supports R-packages or modules tailored for specific statistical operations, and which is accessible through the Comprehensive R Archive Network (CRAN) at http://cran.r-project.org); R-system modules or packages including tsDyn or similar services for facilitating implementation of nonlinear autoregressive time series models, pracma for performing practical numerical mathematical functions, bspec for performing operations related to Baysian inferences on a discrete power spectrum time series, copula for multivariate dependence analysis with Copulas, CopulaRegression for Bivariate Copula based regression modeling, MASS for support functions and datasets for Venables and Ripley's mass, mvtnorm for multivariate normal and t distributions, VineCopula for statistical inference of vine copulas, scatterplot3d for 3D scatter plots, multinbmod for regression analysis of overdispersed correlated count data, zoo for S3 Infrastructure for regular and irregular time series (z's ordered observations), psd for estimating the power spectral density, wavelets for computing wavelets, strucchange for testing monitoring and dating structural change, tseriesChaos for nonlinear time series operations, arulesSequences or similar services for facilitating operations such as K-nearest neighbor distance calculations, SIGNAL or similar services such as MATLAB, for performing signal processing functions such as performing digital synthesis of digital filters such as butterworth, chebyshev, elliptical, finite impulse response filter, infinite impulse response, and savitzky-golay filters and quantreg for computing quantile regression and related methods such as kuantile and quantile. Software packages 126 are associated with services 128, which include IBM infosphere stream processing services, Apache Hadoop and Hbase framework, or similar frameworks operable for providing a distributed file system, and which in some embodiments facilitate or provide access to cloud-based services such as those provided by Cerner Healthe Intent®.

Example operating environment 100 also includes storage (or data store) 121, which in some embodiments includes patient data for a candidate patient and information for multiple patients; variables associated with patient recommendations; recommendation knowledge base; recommendation rules; recommendations; recommendation update statistics; an operational data store, which stores events, frequent itemsets (such as "X often happens with Y", for example), and item sets index information; association rulebases; agent libraries, solvers and solver libraries, and other similar information including data and computer-usable instructions; patient-derived data; and health-care provider information, for example. It is contemplated that the term data includes any information that can be stored in a computer-storage device or system, such as user-derived data, computer usable instructions, software applications, or other information. In an embodiment, data store 121 comprises the data stores associated with the one or more EIR systems, such as 160 and computer system 140. Further, although depicted as a single storage data store, data store 121 may comprise one or more data stores, or may be in the cloud.

Figure 2:
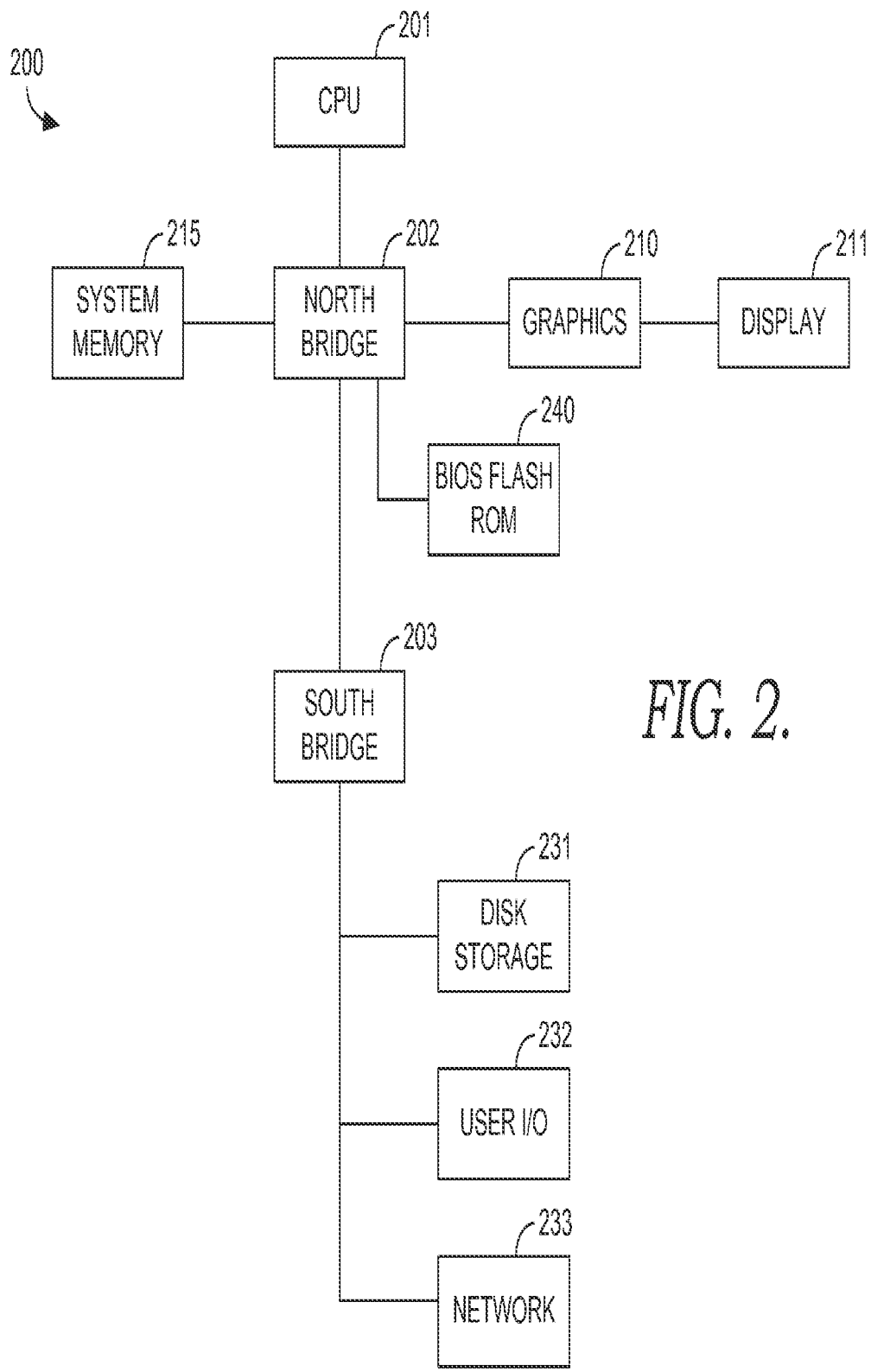
FIG. 2 depicts aspects of an operating computer environment suitable for practicing an embodiment of the invention.

Turning briefly to FIG. 2, there is shown one example embodiment of computing system 200 that has software instructions for storage of data and programs in computer-readable media. Computing system 200 is representative of a system architecture that is suitable for computer systems such as computing system 120. One or more CPUs such as 201, have internal memory for storage and couple to the north bridge device 202, allowing CPU 201 to store instructions and data elements in system memory 215, or memory associated with graphics card 210, which is coupled to display 211. Bios flash ROM 240 couples to north bridge device 202. South bridge device 203 connects to north bridge device 202 allowing CPU 201 to store instructions and data elements in disk storage 231 such as a fixed disk or USB disk, or to make use of network 233 for remote storage. User I/O device 232 such as a communication device, a mouse, a touch screen, a joystick, a touch stick, a trackball, or keyboard, couples to CPU 201 through south bridge 203 as well. The system architecture depicted in FIG. 2 is provided as one example of any number of suitable computer architectures, such as computing architectures that support local, distributed, or cloud-based software platforms, and are suitable for supporting computing system 120.

Returning to FIG. 1, in an embodiment, computer system 120 is a computing system made up of one or more computing devices. In an embodiment, computer system 120 includes an adaptive multi-agent operating system, but it will be appreciated that computer system 120 may also take the form of an adaptive single agent system or a non-agent system. Computer system 120 may be a distributed computing system, a data processing system, a centralized computing system, a single computer such as a desktop or laptop computer or a networked computing system.

In an embodiment, computer system 120 is a multi-agent computer system with agents. A multi-agent system may be used to address the issues of distributed intelligence and interaction by providing the capability to design and implement complex applications using formal modeling to solve complex problems and divide and conquer these problem spaces. Whereas object-oriented systems comprise objects communicating with other objects using procedural messaging, agent-oriented systems use agents based on beliefs, capabilities and choices that communicate via declarative messaging and use abstractions to allow for future adaptations and flexibility. An agent has its own thread of control which promotes the concept of autonomy.

In an embodiment, a corporate benefits analyst operates system 140, for a uniformly priced company health service plan, which is available to all employees offering plans at the same price. In an embodiment the analyst obtains voluntary permission from employees at enrollment time for the employee to participate in an incentive program to receive a rebate, or discount on the premium for participation in a health risk assessment and/or reduction program. Analyst system 140 queries the credit rating agency systems 191, 190 and 142 periodically obtaining soft-pull data for each enrolled employee, and the raw data is stored in storage 121. As a result of processing the credit time history, as disclosed further herein, the analyst system 140 determines a risk category for an incentive program enrollee, such as, likely to increase in debt-load, or erratic debt-load, or likely to enter a high risk of financial stress. In an embodiment, the category is selected based on a predictor that predicts an increased frequency of healthcare visits at some point in the future based on a current history of personal financial records. In an embodiment, the category is correlated with claim amount. In an embodiment the category is correlated with a quantifier that incorporates through a mathematical equation both claim frequency and claim amount into a composite score. In an embodiment the category of enrollee that has been identified is communicated to the analyst in the form of a text alert, e.g. "enrollee John Doe is likely to enter a high risk financial stress region in one year, recommend incentive X, for contact at JohnDoe@gmail.com." Where X may be an incentive consisting of one or more of: providing discounted financial education service, providing discounted stress management service, providing reward incentives such as a greater discount on healthcare insurance, free meals, drinks, coupons, etc. if John Doe completes a company provided mitigation service such as visiting a personal finance coach. In an embodiment a message to the analyst indicates the frequency of high stress present in an applicant pool, while keeping the identities confidential, so that the analyst is able to make recommendations for funding mitigating services. For example, on the basis of such information, a free course is offered to all employees for reducing financial stress, and free follow-up given anonymously, without the analyst knowing the particular details for any individual of underlying financial data or category. In an embodiment, a plan offers a three-tier price level, with a first, highest level available to all who wish to keep their financial records private, a second discounted level available to those who allow their records to be accessed, but who have poor financial performance, and a third, most discounted level available to those who allow their records to be accessed, and demonstrate a low fiscal stress life style through the testing described herein.

Out of necessity, astrophysicists who study gravitational waves have developed techniques that extract the maximum amount of information from short time series that arise from brief events or short time series. The same mathematical methods that are used in empirical identification of time series associated with gravitational waves can be fruitfully applied to the problem of identifying other short time series, including time series that arise in health and health care contexts.

The existence of gravitational waves has been inferred from changes in the orbital periods of several binary pulsars, such as PSR 1913+16. However, gravitational waves have not yet been directly detected on Earth because of their extremely small effect on matter. 'Orbital lifetime' is a characteristic property of celestial objects that are gravitational radiation sources. Orbital lifetime determines the average number of binary stars in the universe whose gravitational waves are likely to be detectable. Short-lifetime binaries produce strong, readily-detectable gravitational radiation but are rare. Long-lifetime binaries are more numerous but are emit gravitational waves that are weak and hard to detect. The ground-based instrument called LIGO (the Laser Interferometer Gravitational-Wave Observatory; two observatories 3 km apart) is most sensitive in the frequency band (30 Hz to 7 KHz) where two neutron stars are about to merge.

The time frame for merger or coalescence lasts only a few seconds. The LIGO or similar instruments must detect this "blink" of gravitational waves emitted over a few seconds out of a million-year orbital lifetime. It is calculated that only about once per decade or so does a coalescence of two neutron stars happen in a manner that could be detected by LIGO. The Laser Interferometer Space Antenna (LISA; three spacecraft 5 million km apart, flying in a triangle formation) is a planned collaboration between the U.S. space agency, NASA, and the European space agency ESA. If completed, LISA would be most sensitive in the frequency band between 0.1 mHz and 100 mHz, where coalescence of massive black holes or galactic binaries would be detected in the final months leading up to merger.

In astrophysics, binary systems of objects that radiate gravitational waves may, over time, experience a decrease in the distance between the objects. This causes the emitted waves' frequency and amplitude to increase over time. The swept-frequency pattern is known as a 'chirp'. Other types of objects that radiate gravitational waves include spinning neutron stars, whose waves' frequencies and amplitudes follow a recurrent, periodic cycle. In the case of the gravitational collapse of massive stars, resulting in supernovae, the patterns of gravity wave emission are far more complex and burst-like, with chirp-up and chirp-down motifs with frequencies ranging over 2 or 3 or more orders of magnitude in the frequency domain.

As noted above, gravitational wave bursts can have a very short duration, so current GW detector design has to take this into account. There are approximately 3×10-10 msec per year, so even a fluctuation that has a probability of $10^{\wedge}-10$ of occurring is likely to occur in one year of data. In order to eliminate most false-positive signals, a signal-to-noise ratio threshhold is often used or, in some cases, multi-detector coincidence discrimination. But in insurance underwriting, there may be no need for coincidence discrimination by multiple events synchronously incident upon two or more 'detectors'. Ordinarily, each event is incident upon only one insured. An embodiment, therefore utilizes a gravitational wave analytic method that does not depend on multi-detector coincidence detection.

Furthermore, traditional time-series analysis and forecasting methods are highly sensitive to the sequence in which events occur. Van den Berg described an example where the frequency domain power spectrum of a time series s(t) can accurately establish the probability of the identity of an object when ordinary human and time-series methods fail to identify the object correctly. The power spectrum of a classical symphony or other musical work reveals in each time segment the dominating key, through the pattern of spectral intensities at frequencies associated with fundamentals and harmonics. If the sections of the musical work are played in a different order, the power spectrum would not change, but the ear and the mind, which make time-frequency analysis, perceive a very different content then compared to how the original symphony is perceived. To avoid excessive sensitivity to arbitrary differences in the sequencing of events, an embodiment relies on a frequency-domain power spectrum analysis method to detect predominant frequencies and motifs.

On a finite segment of length delta-t, the resolution in frequency is 1/delta-t. We can give up fine resolution in frequency-space but, by so doing, gain information about when an event happened. Therefore, in one embodiment, rather than working in frequency-space with arbitrarily good resolution, we operate in the time-frequency plane, achieving a good compromise between the accuracy in frequency and the accuracy in time. This has advantages when we aim to detect transient phenomena, such as gravitational wave bursts or irregular alternations of patterns of credit utilization ratio changes (CUR motifs).

In this regard, it is a commonplace that people naturally experience 'epochs' in their personal financial history. Each epoch is associated with characteristic patterns and rates of spending and, often, health services utilization. The temporal event motifs of chronic conditions like FICO score <600 or FICO score >800 are distinct and different from motifs associated with conditions such as arise with financial shocks that accompany major family events, like undertaking or retiring major mortgage or installment debt, birth of a child, children's entry into college, divorce, death of a member of the immediate family, retirement from employment, and so forth. The motifs associated with declining liquidity are punctuated by 'ups-and-downs', but the epochs' durations and successors are not, in general, as predictable as for the conditions noted for 'exacerbations-and-remissions'. Through power spectrum analysis methods the offset of one epoch and the onset of a new epoch can often be detected from time series, within a span of 3 or 4 events or measurement periods.

An embodiment treats the median power spectrum likelihood ascertained by Bayesian Markov Chain Monte Carlo simulation as one marker or 'weight' that measures instability of credit utilization ratio time series and, optionally, may measure the similarity of the record associated with the current entity to records from putative matching entities stored in the target database. In an embodiment, a distance between a reference spectrum ref1 and the present spectrum estimate is found, and the distance dl is compared to a distance threshold Td to determine whether or not the likelihood measure dl is below a Td. When the likelihood measure dl is below Td then an adverse loss ratio or excess claim condition is predicted. When the likelihood measure dl is above Td then an acceptable loss ratio or an acceptable claim frequency is predicted.

Figure 3:
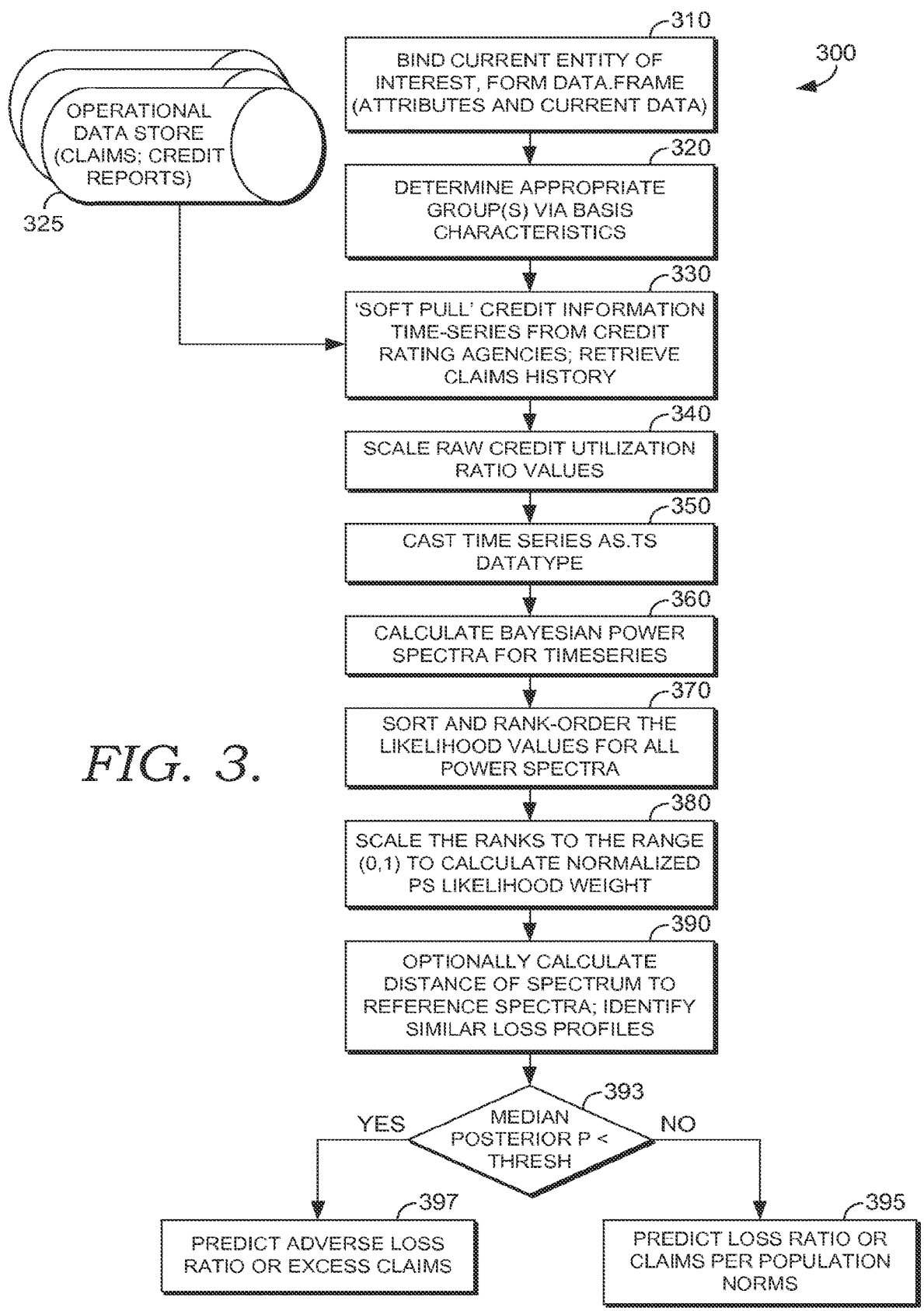
FIG. 3 depicts a flow diagram of a method for insurance risk scoring, in accordance with embodiments of the invention.

Turning now to FIG. 3, there is depicted in 300 a representative flow diagram of insurance risk decision processing. In an embodiment, a risk estimate is formed as a predictor of loss. In an embodiment the loss ratio experienced for an individual in the claims database is computed as a ratio of cost to the difference of revenues and cost. At 310 the current entity of interest is bound to the data to form data.frame (attributes and current data). The person being studied for risk assessment is associated with a data frame for analysis. At 320 the Groups are determined via Basis Characteristics. For example, there may be different groups of insured individuals that are separately grouped for analysis purposes. A family plan insurance enrollee, for example, is studied as a member of the family group, who, no doubt will have a higher number of claims associated, on average, than an individual enrollee, all other things being equal. Another example of determining group is high, medium, or low deductible plans. The high deductible plan enrollee is likely to have fewer claims than a low deductible enrollee, thus in an embodiment, the model is formed for each group, and predictions are made with a knowledge of the group modeled.

At 330 a "soft Pull" credit information time series is formed. In an embodiment data is originally drawn from a credit agency such as 190, on a periodic basis, e.g., daily, weekly, bi-weekly, monthly, quarterly, etc. and stored in operational data store 325. In an embodiment a sliding window of data is formed from the raw data forming a minimum analysis window. In an embodiment a 24 month window is used for input time series. In an embodiment, a window length of 24 samples is used. At 340 the raw credit utilization ratio values are scaled to put all data on the same interval range and meaning. Different reporting agencies may have different periods or conditions for reporting soft-pull data, and so this step, when used, mitigates any potential agency bias.

Beginning at 350 and continuing through 360, and 370 to 380, a method of determining a normalized likelihood weight from time series data is provided. Additional information about determining a normalized likelihood weight from a time series is provided by U.S. patent application Ser. No. 13/874,961 titled "System and Method for Record Linkage," filed on May 1, 2013, which is herein incorporated by reference in its entirety.

At 350 the time series is cast as a time series datatype. In an embodiment, the time series is projected beyond the observed time using a linear trend extension of the last six months of samples to project a trend into the next six or eight months of samples. In an embodiment, the linear projection is capped, so that the projection does not extend above 100% credit utilization. In an embodiment the most recent samples are mirrored to project behavior for future months. In an embodiment, the record is extended into the future to form a power of two sample size such as 32 samples. In an embodiment, the time series is created at a high sampling rate such as a daily basis or a weekly basis, and the data is reduced to a monthly value by taking the peek credit utilization over a monthly window to form the time series. In an embodiment, a windowing method is applied to minimize a discontinuity at the edge of the sample window. In an embodiment, records are overlapped and windowed to form two parallel time series records, and two resultant power spectrum estimates, and the resulting power spectra area added to form a power spectrum estimate. In an embodiment, the overlapped records only differ by a single month of data.

At 360 the Bayesian power spectra is computed for the time series. In an embodiment, the R-System package bspec is used. In an embodiment, a power spectrum estimate is formed using one of a wavelet transform, a discrete cosine transform, a discrete fourier transform, a periodogram method, a Bartlett method, a Welsh method, and an autoregressive moving average estimate. In an embodiment, the low frequency terms are used, and the high frequency terms are discarded. In an embodiment only the lowest eighth of the frequency terms are kept. In an embodiment the likelihood (probability) of each spectrum is calculated by iteratively permuting the spectrum and sampling the resulting permutations by Bayesian Markov Chain Monte Carlo simulation. In an embodiment 500 iterations are computed, and the median likelihood for each entity is retained.

In an embodiment the entropy is computed by one of the Shannon entropy, symbol entropy, approximate entropy or Chao-Shen entropy. In an embodiment the disorder in the spectrum is quantified and used as a measure of disorder in a financial time series.

In an embodiment, a variability statistic such as entropy is calculated. In an embodiment the entropy is computed by one of the Shannon entropy, approximate entropy, or Shannon Renyi entropy. In an embodiment a variability statistic over the raw CUR series is calculated. In an embodiment, a variability statistic and/or entropy is calculated from a series as provided in U.S. Provisional Patent Application 61/879,792 titled "Personal Analysis and Chronotherapy," filed on Sep. 19, 2013, which is herein incorporated by reference in its entirety.

In an embodiment a variability statistic is calculated iteratively as each observation sample, such as monthly sample is added.

At 370 the likelihood values for all power spectra are optionally sorted and rank-ordered.

At 380 The resulting series is scaled to a range such as (0,1), to calculate a normalized power spectrum likelihood weight.

At 390 a distance is optionally calculated between the resultant spectrum and one or more reference spectra. A number of reference spectra may be chosen according to classification criteria, such as identifying clusters for choosing a threshold that is commensurate with the underlying pattern. For example, ref1 typifies cluster1, ref2 typifies cluster 2, ref3 typifies cluster 3. In an exemplary embodiment a distance is calculated from the reference spectra to each of ref1, ref2, and ref3, and if the distance is small between ref3 and the resultant spectrum, then the cluster 3 threshold is used at 393 rather than the default threshold. Other reasons for calculating distances might include tracking the spectrum change month to month, or adapting the underlying reference model over time. Other reasons for calculating a distance include looking for aberrant patterns from the past that have been associated with very poor individual claims performance In such a use case, an aberrant pattern is identified by checking each case of bad individual claim performance, and testing the distance of the use case from other, non-aberrant cases across the spectrum of users. In an embodiment machine learning is used to identify an aberrant pattern worthy of looking for in the future.

In an embodiment distance is a vector norm formed over the difference vector. In an embodiment the norm is the 2-norm or euclidean distance. In an embodiment, the distance is the p-norm. In an embodiment the distance is the 1-norm or sum of absolute values of elements. In an embodiment the norm is the infinity norm, or effectively the maximum absolute value over the set of elements.

In an embodiment, variability is taken as an indication of stress. In an embodiment percentiles are calculated over the interval from the CUR data, including in an embodiment, variability or entropy. In an embodiment, a stress statistic is formed to represent the stress of the applicant for incorporation into an actuarial model of risk. In an embodiment a stress statistic is formed over a time series representing variability of the CUR time series. In an embodiment the stress statistic is formed by computing one or more of mean, median, mode, standard deviation, variance, skewness, kurtosis, mean absolute difference, median absolute difference, a rank order statistic, an absolute difference, a peak value, a coefficient of variation, and a peak difference. In an embodiment, adjacent values in a series are compared by forming a first adjacent absolute difference statistic and a second adjacent absolute difference statistic, and so on until a kth adjacent absolute difference statistic is calculated. In an embodiment disorder is quantified as the sum of the averages of the first k absolute difference statistics. In an embodiment k=3. In an embodiment k=5.

In an embodiment a risk category such as high risk, moderate risk, or low risk is computed from the stress statistic. In an embodiment a percentile of a statistic is identified for the applicant. In an embodiment the applicants in a pool that are among the top X % of variability or entropy are identified as high stress. In an embodiment the applicants in a pool that are among the bottom Y % are identified as being low stress. For example, the highest 10% of entropy are determined to be in a high variability regime with increased stress, and the bottom 20% are deemed to be in a regime with decreased stress. In an embodiment, percentages are identified in an insurance coverage sense are calculated. In an embodiment one or more stress statistics are used as an input into an actuarial model that calculates one or more of insurance risk score, predicted insurance loss ratio, predicted annualized claim number, likelihood of excess claims, and other indeces. In an embodiment amount of disorder is taken as a reflection of stress.

At 393 a decision is formed, e.g. by comparing the median posterior probability to a threshold. If the probability is greater than the chosen threshold, the method proceeds to 395 where a favorable claims condition is predicted such as an acceptable loss ratio or claims frequency is below population norms. In an embodiment a claim risk category is stored, e.g. in operational data store 325. In an embodiment, at 395 a favorable claim condition is predicted and displayed as shown, e.g. in FIGS. 10A-10C. If the probability is less than the threshold, the method proceeds to 397 where an unfavorable claims condition is predicted such as adverse loss ratio or excessive amounts of claims. In an embodiment, at 397 a claim risk category is stored, e.g. in operational data store 325. In an embodiment, at 397 an unfavorable risk condition is displayed as shown in one or more of FIGS. 7A-7C. An embodiment selects the threshold weighing the relative financial costs of an estimated false positive rate against the costs of an estimated false negative rate. An embodiment selects the threshold to identify a certain fraction of the population as determined to be of higher risk. For example, in an embodiment in which the financial coaching services are provided free of charge, the top N employees could be identified as most likely in need of stress-reducing financial coaching. In an embodiment, a low-risk pool, such as the bottom 5% of risk is identified as a pool that would be desirable clients to attract, or as meriting a lower cost-group.

In an embodiment, at 393 a decision is formed by comparing a number of distance measures to a threshold, so that the method proceeds to 395 when all of the distances compared are greater than the corresponding thresholds for each test, and predicts that the loss ratio is acceptable or the claims frequency are in accord with population norms. When at least one of the distance measures are less than a threshold, the method proceeds to 397 where an adverse loss ratio is predicted or excessive claims frequency is predicted.

In an embodiment, at 393 a likelihood measure is chosen to be near zero when a calculated distance is within a tolerance of zero, and otherwise the likelihood is determined to be a reciprocal of the distance measure. In an embodiment a likelihood measure is chosen to be near zero when the sum of the distance measures is within a tolerance of zero, and otherwise the likelihood measure is determined to be a reciprocal of the sum of the distance measures.

Continuing with FIG. 3, and approaching the algorithm performance from another vantage point, a flow diagram is provided which illustrates an embodiment of a system and method for generating a list of claim performance predictions.

An embodiment includes the following steps:

1. Bind the record of an entity for which it is desired to find any and all matching entities in the target system.

2. Optionally, determine the group to which the entity belongs, based on policy type or conventional basis characteristics.

3. Perform "soft pull" inquiry for preferably not less than 24 months of credit utilization ratio data, from one or a plurality of credit rating agency records.

4. Scale the raw CUR values if necessary (for example, to a unified scale from 0.0 to 1.0, or to a unified scale from 0 to 100).

5. Take the x.

6. Scale the credit utilization values to a standardized scale (for example, 0 to 1 or 0 to 100 floating-point).

7. Calculate power spectra for each time series from Step 6.

8. Calculate the likelihood (probability) of each spectrum by iteratively permuting the spectrum and sampling the resulting permutations by Bayesian Markov Chain Monte Carlo simulation, preferably executed not less than 500 iterations, retaining the median likelihood for each entity.

9. Sort and rank-order the median likelihood values.

10. Normalize the likelihood values from Step 9 to lie within the range (0,1) to form a power spectrum weight (PS_wt) for each entity.

11. Determine for each entity whether the power spectrum weight of Step 10 exceeds an heuristic threshold, or utilize the power spectrum weight as an Insurance Risk Score independently from other actuarial models and methods.

12. Optionally, enter the value of the power spectrum weight or a transformed variable derived from the power spectrum weight into an actuarial model in combination with a plurality of other basis characteristics variables.

An embodiment of the flow diagram of FIG. 3 is shown in greater detail in the computer program routine shown in FIG. 15. The total loss may be estimated using a regression model as demonstrated in the program routine shown in FIGS. 16A-C.

Figures 4A, 4B, 4C:
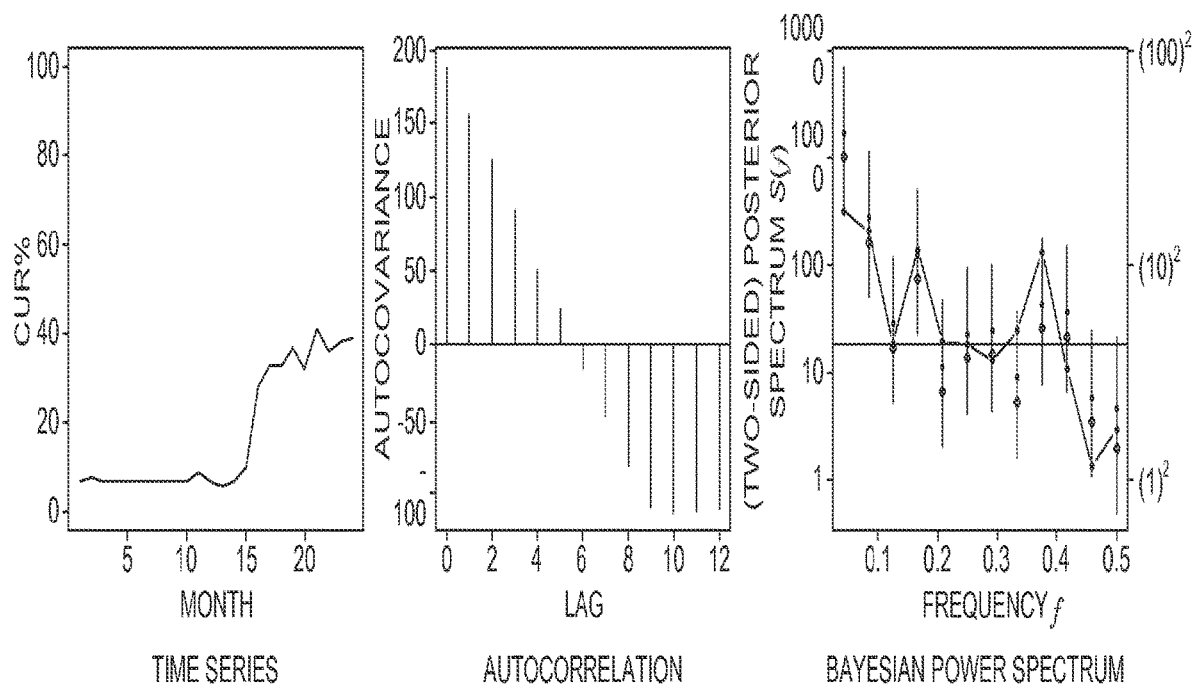
FIGS. 4A-4C depict a representative display presenting an analysis for a first individual, consisting of Time Series (TS) FIG. 4A, Autocorrelation function (ACF) FIG. 4B, and Power Spectrum (PS) FIG. 4C, respectively.

Turning now to FIGS. 4A-4C, there is shown therein a representative analysis for a first individual over a 24 month interval as depicted in the originating time series (FIG. 4A), the resultant autocorrelation function (FIG. 4B) and the resultant Bayesian Power Spectrum with error bars (FIG. 4C). Representative data for the first individual shows a car purchase which happened at some time after the 14th month. This car purchase resulted in a hard pull of the credit information of the applicant from a credit agency. For this case, the underlying model produced a Median posterior Bayesian likelihood near zero and therefore predicted excess claims in the subsequent 12 month interval, since a probability threshold of about $10^{-5}$ is used for the illustrated embodiment. There were no excess claims experienced in this case for the subsequent 12 month interval.

Figures 5A, 5B, 5C:
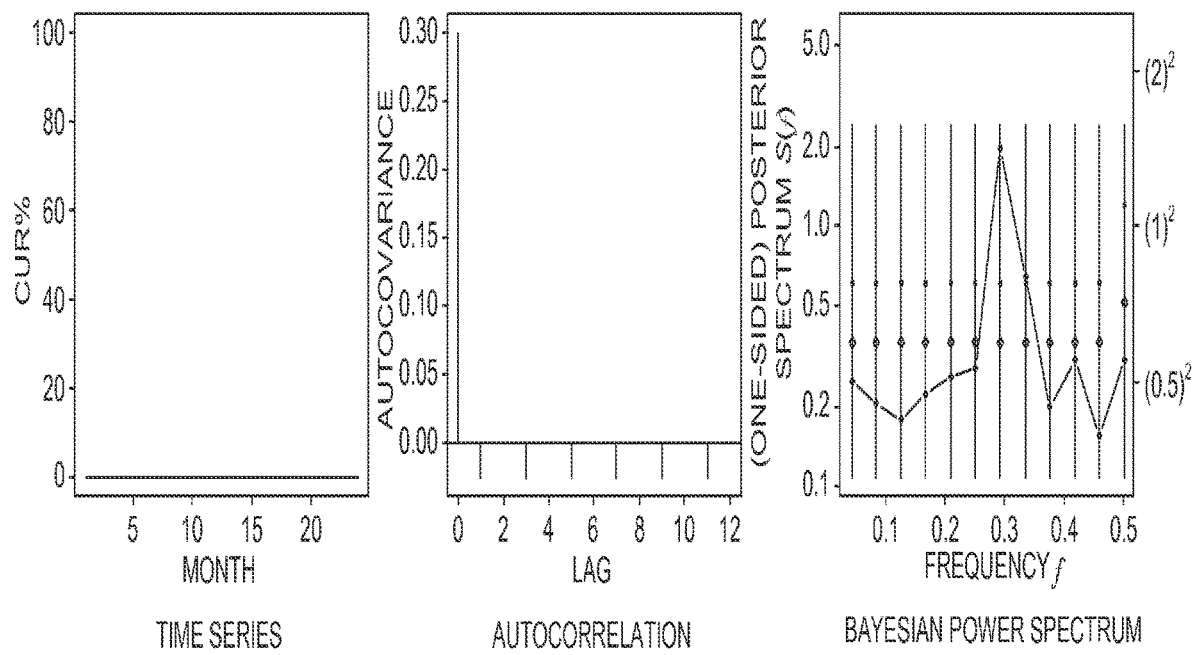
FIGS. 5A-5C depict a representative display presenting an analysis for a second individual, consisting of TS FIG. 5A, ACF FIG. 5B, and PS FIG. 5C, respectively.

Turning now to FIGS. 5A-5C, which presents a case analogous to FIGS. 4A-4C for a second individual with completely flat CUR time series of zero ratio. Since CUR is ordinarily defined as the amount of all outstanding balances on all credit cards divided by the sum of the limits of the credit cards, and is typically expressed as a percentage. FIG. 5A depicts a person with no balance, and no activity over the interval. Since the probability is still below the threshold, the embodiment depicted does not flag the second individual as likely to have excess claims in the subsequent 12-month interval. The second individual is living debt-free. Notice the results would be the same for a person who was not allowed to carry any debt balance, because he had not been issued any credit cards with allowed balances.

Figure 6A:
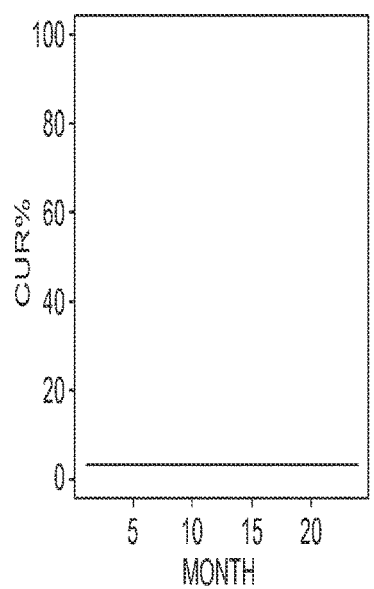
FIGS. 6A-6C depict a representative display presenting an analysis for a third individual, consisting of TS FIG. 6A, ACF FIG. 6B, and PS FIG. 6C, respectively.
Figure 6B:
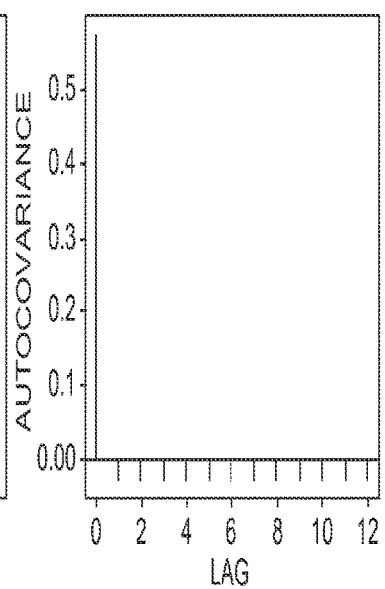
Figure 6C:
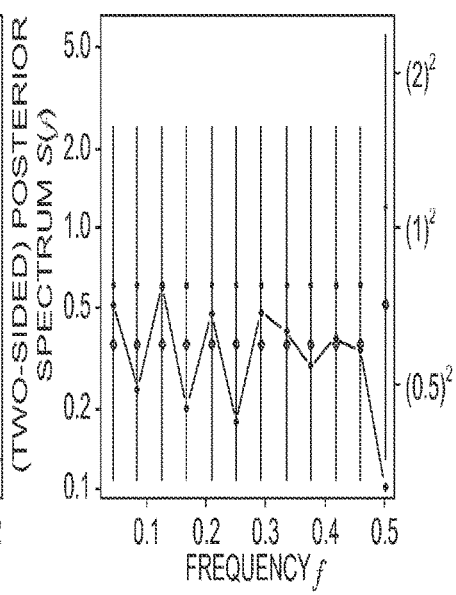

Turning now to FIGS. 6A-6C, which presents a case analogous to FIGS. 4A-4C for a third individual with completely flat CUR time series but a small (3%) balance that remains for the interval. The decision for the third individual is the same as for the second individual. Thus the illustrated embodiment makes a similar decision even if an individual carries a stable load of debt, as opposed to living debt-free.

Figure 7A:
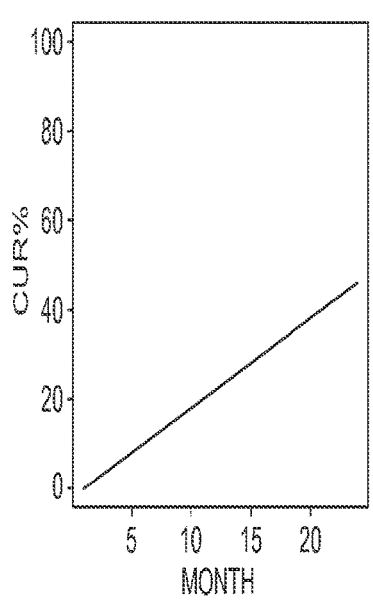
FIGS. 7A-7C depict a representative display presenting an analysis for a fourth individual, consisting of TS FIG. 7A, ACF FIG. 7B, and PS FIG. 7C, respectively.
Figure 7B:
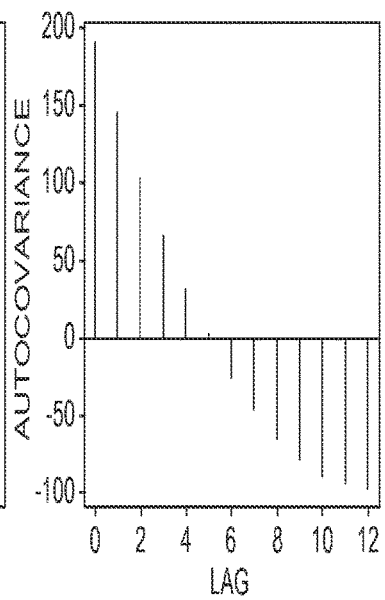
Figure 7C:
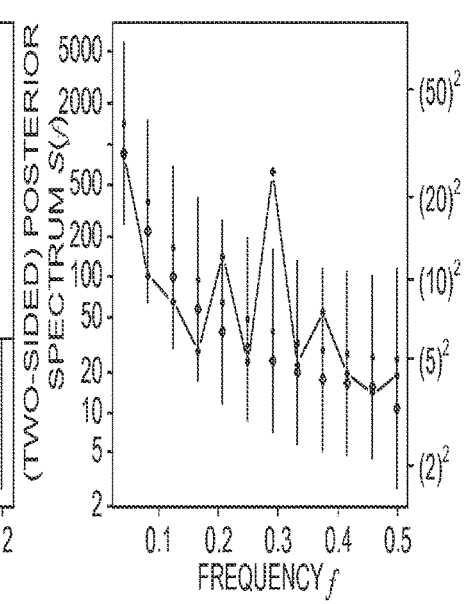

Turning now to FIGS. 7A-7C, which presents a case analogous to FIGS. 4A-4C for a fourth individual who has been building debt balance for two years. The illustrated embodiment decides based on the power spectrum that excess claims are likely in the subsequent 12 month interval.

Figure 8A:
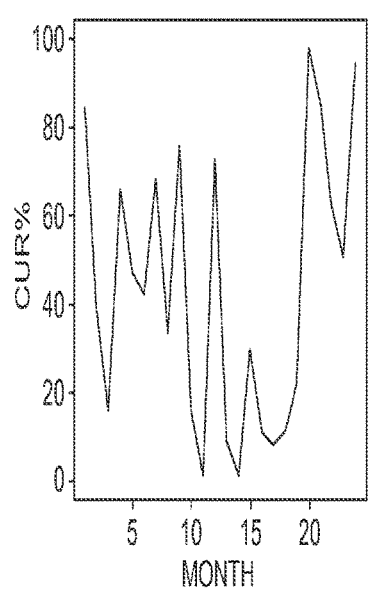
FIGS. 8A-8C depict a representative display presenting an analysis for a fifth individual, consisting of TS FIG. 8A, ACF FIG. 8B, and PS FIG. 8C, respectively.
Figure 8B:
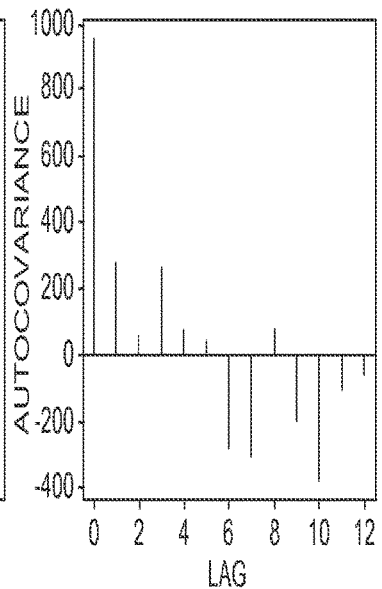
Figure 8C:
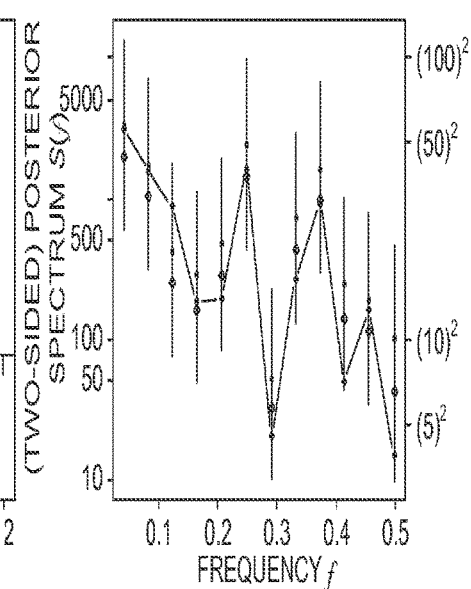

Turning now to FIGS. 8A-8C, which presents a case analogous to FIGS. 4A-4C for a fifth individual who has an erratic balance over the two years. The illustrated embodiment decides based on the power spectrum that excess claims are likely in the subsequent 12 month interval.

Figure 9A:
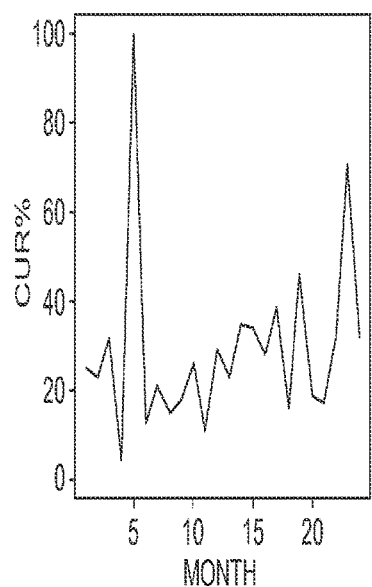
FIGS. 9A-9C depict a representative display presenting an analysis for a sixth individual, consisting of TS FIG. 9A, ACF FIG. 9B, and PS FIG. 9C, respectively.
Figure 9B:
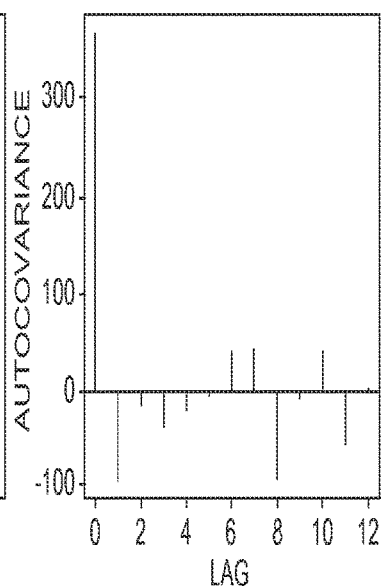
Figure 9C:
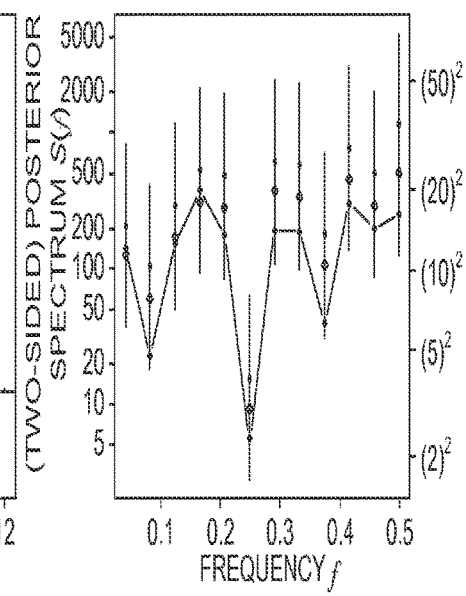

Turning now to FIGS. 9A-9C, which presents a case analogous to FIGS. 4A-4C for a sixth individual who has an erratic and balance over the two years, with a recent trend toward increasing balance and instability. The illustrated embodiment decides based on the power spectrum that excess claims are likely in the subsequent 12 month interval.

Figure 10A:
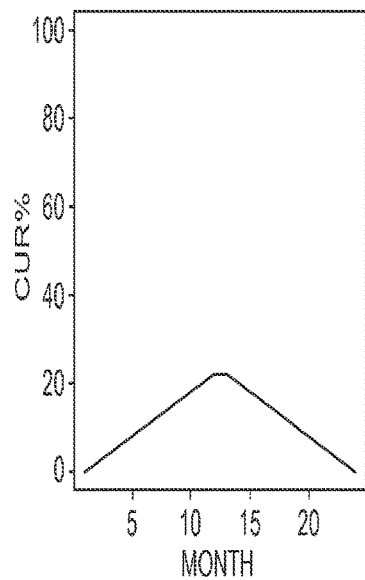
FIGS. 10A-10C depicts a representative display presenting an analysis for a seventh individual, consisting of TS FIG. 10A, ACF FIG. 10B, and PS FIG. 10C, respectively.
Figure 10B:
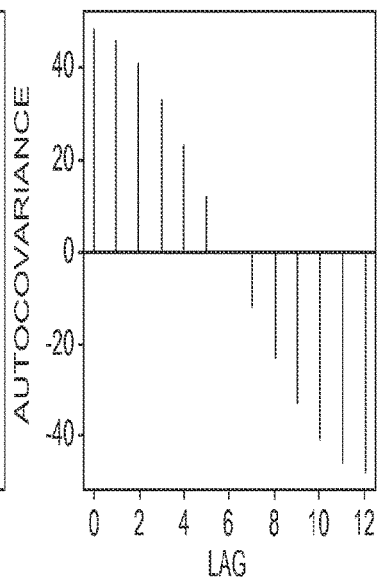
Figure 10C:
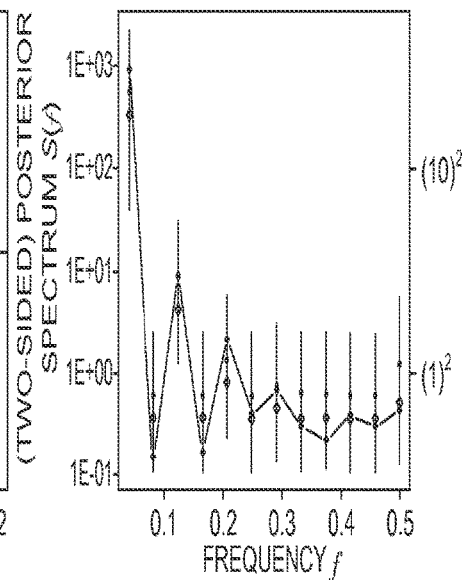

Turning now to FIGS. 10A-10C, which presents a case analogous to FIGS. 4A-4C for a seventh simulated individual who has had a small budgeting variation has curtailed it over the two years. The illustrated embodiment decides based on the power spectrum that excess claims are not likely in the subsequent 12 month interval. In an embodiment, a small amount of stable variation like the present case is used to select a threshold, for example, choosing the threshold as a factor smaller than the resultant value, e.g. a factor of 2 or a factor of 5, or a factor of 10.

Figure 11A:
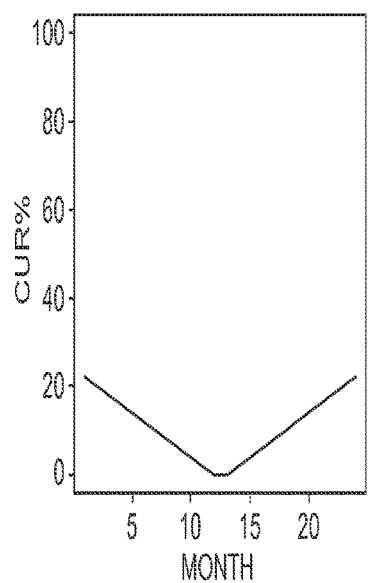
FIGS. 11A-11c depict a representative display presenting an analysis for a eighth individual, consisting of TS FIG. 11A, ACF FIG. 11B, and PS FIG. 11C, respectively.
Figure 11B:
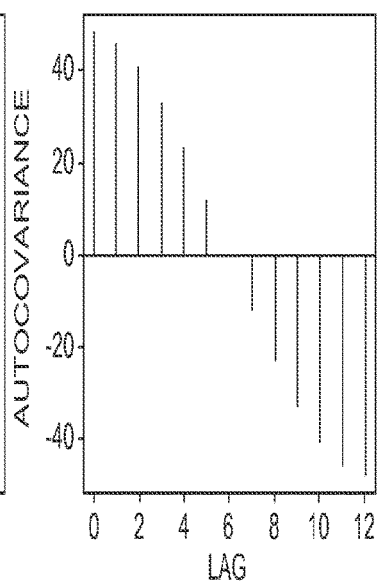
Figure 11C:
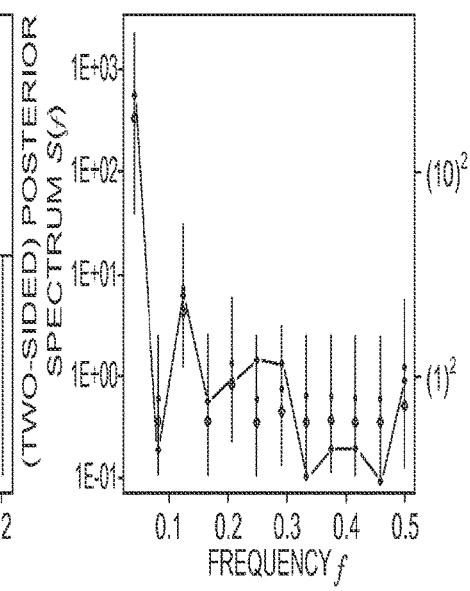

Turning now to FIGS. 11A-11C, which presents a case analogous to FIGS. 4A-4C for an eighth simulated individual who has had a small budgeting variation but has curtailed similar problems in the past over the two years. The illustrated embodiment decides based on the power spectrum that excess claims are not likely in the subsequent 12 month interval.

Figures 12A, 12B, 12C:
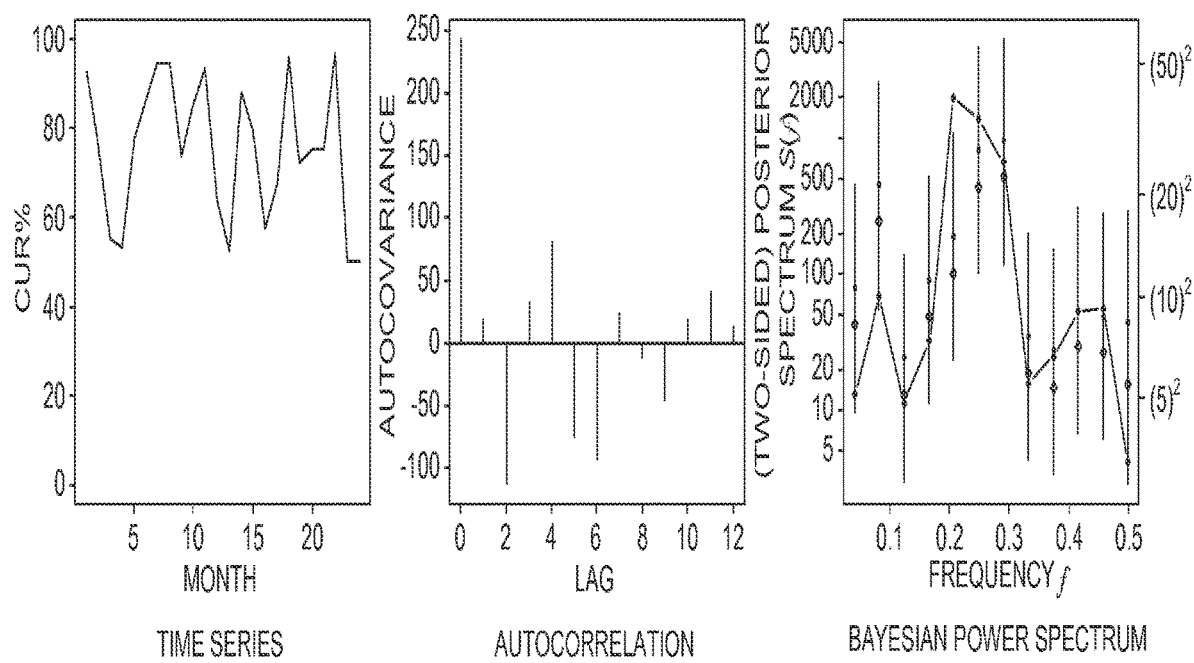
FIGS. 12A-12C depict a representative analysis for a ninth individual, consisting of TS FIG. 12A, ACF FIG. 12B, and PS FIG. 12C, respectively.

Turning now to FIGS. 12A-12C, which presents a case analogous to FIGS. 4A-4C for an ninth individual who is carrying a large and variable balance over the two years. The illustrated embodiment decides based on the power spectrum that excess claims are likely in the subsequent 12 month interval.

Figure 13A:
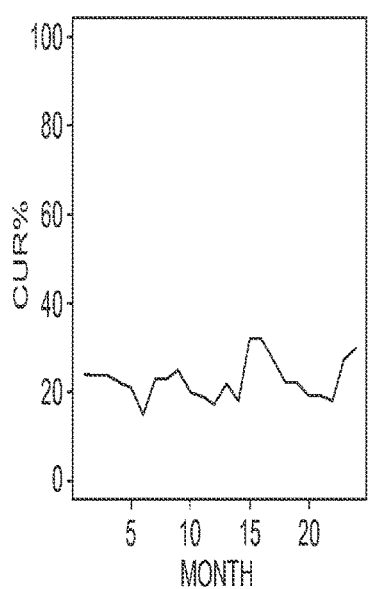
FIGS. 13A-13C depict a representative display presenting an analysis for a tenth individual, consisting of TS FIG. 13A, ACF FIG. 13B, and PS FIG. 13C, respectively.
Figure 13B:
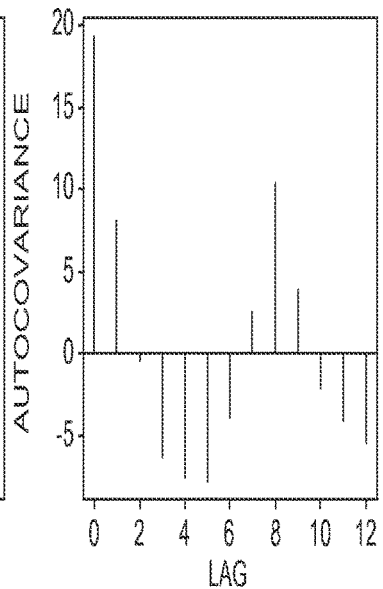
Figure 13C:
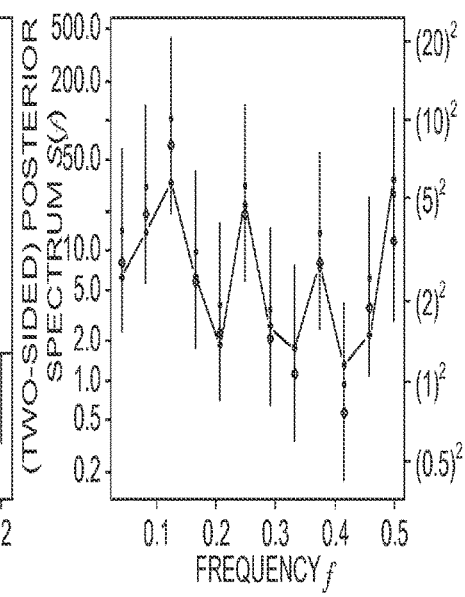

Turning now to FIGS. 13A-13C, which presents a case analogous to FIGS. 4A-4C for an tenth individual who is carrying a small and variable balance over the two years. The illustrated embodiment decides based on the power spectrum that excess claims are likely in the subsequent 12 month interval. This example thus presents a false-positive result.

FIG. 14 illustrates performance of a personalized insurance risk scoring using credit utilization time series. A series of 1,002 subjects received informed consent according to applicable U.S. law and regulations. Measurements of subjects' credit were collected via monthly "soft pull" inquiries to credit rating agencies for each subject for a period of 24 months. Records were randomly selected from a health plan records data warehouse (analogous to an EIR) containing 100% of claims that are incident upon the plan during the year subsequent to the measurement period. The personally-identifiable information was removed in conformance with U.S. HIPAA law and regulations, and the de-identified data were stored in a separate, secure database. We recast the data in the form of time series, and analyzed the sequences using the open-source R statistical package bspec. The results shown in FIG. 14 indicate that there were about 21 false positives in the pool, for a false positive rate of about 2%.

Accurate loss ratio estimation is vital to the financial performance of insurance products and health plans. In an embodiment an application service enables improvements in loss ratio estimation in insurance underwriting and pricing, particularly in health insurance.

Stress affects claims because it is a gateway to serious health conditions, to less healthful lifestyle choices and behavior, and to worsening existing health conditions, resulting in deteriorating insurance loss ratio and claims experience.

Stress is widespread in society and in the workplace. Hundreds of research studies have examined how aspects of jobs, organizational behavior, and activities of daily living can create stress for consumers and can contribute to mental health conditions and other physical health problems. Events in one's family can be a major source of stress that can manifest itself in the workplace. Many persons in the prime of their working years are stressed by caring for both young children and for an aging parent. Many caregivers experience significant employment-related consequences from having to balance greater amounts of time devoted to providing family support with time at work.

Insurance Risk Scores must be based exclusively on objective, factual information, including consumer accounts such as credit cards, retail store cards, mortgages, and auto loans. Public record information, including bankruptcies, liens and judgments, and collection accounts are also permitted. All of this factual credit information is received by credit rating agencies such as Equifax, TransUnion, Experian, and FICO from tens of thousands of financial institutions, retailers, and court houses on a monthly basis.

To date, no basis characteristic related to patterns of credit utilization ratio or other information in credit reports has been known to be prohibited by the Comptroller of the Currency, for use in insurance underwriting. The present technology solves the challenge to discover how such information relates to health claims experience and services utilization.

An application service performs periodic, ongoing "soft-pull" retrievals of an insured individual's credit utilization ratio or CUR. The CUR is the percentage of the total lines of credit that are currently being used (currently unpaid balances). Bi-weekly or monthly values are assembled into a time series for each insured, and a Bayesian power spectrum is calculated. A mathematical model calculates the amount of irregular or chaotic variability (entropy), and the Bayesian probability (spectral likelihood) is also computed. The result is a measure that correlates with the number and size of insurance claims. An embodiment focuses on medical or health-related claims. In an embodiment empirical financial stress variability is used as a relationship to determine claim risk for other insurance types such as property, auto, life, casualty, etc.

In other words, the amount of credit extended that is used by the insured has only a weak relationship to claims experience, but spectral-analytic features of the variability in the CUR are strongly and consistently related to claims. An application service provides a new and important measure of financial stress that is distinct from traditional actuarial measures and distinct from "macro" financial metrics like the CUR itself. The underlying metric provides an important new predictor of health-related financial risk that works hand-in-hand with conventional actuarial models.

In an embodiment an application service is embedded as a component in an existing model for plan and product management, premia-setting, cash-reserving, and other purposes.

Financial Stress is related to Health increased insurance claims. An application service predicts the effect of financial stress on future health claims that can arise in several ways. A number of studies suggest that the impact of debt on mental health may be mediated by personal attitudes towards debt or, more specifically, "debt worry." It is possible, for example, that participants' attitudes towards debt as recorded in the studies also reflect other personal concerns or variables that may not be measured (for example, current income, expected future income, family financial situation).

Where unmeasured or not controlled for, these variables may also impact the measures of a person's mental health or psychological wellbeing. Similarly, anxiety about debt might reflect a person's general anxiety or psychological outlook.

People who score higher on measures of anxiety or depression might be more likely to have a negative view of their finances. Although studies indicate a correlation between actual debts and debt worries, there is also evidence that the relationship between the two is more complex, and may additionally be affected by other factors.

Although the invention has been described with reference to the embodiments illustrated in the attached drawing figures, it is noted that substitutions may be made and equivalents employed herein without departing from the scope of the invention. For example, additional steps may be added and steps omitted without departing from the scope of the invention.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computerized method comprising:
   determining a time series for a set of applicant credit utilization data comprising a structured time series that is scaled based on a standard interval range;
   determining a frequency domain power spectrum based on the time series;
   determining values for a spectrum likelihood measure based at least in part on the frequency domain power spectrum, the values determined using at least one of a wavelet transform, a discrete cosine transform, a discrete Fourier transform, a periodogram method, a Bartlett method, a Welsh method, or an autoregressive moving average estimate;
   scaling the values of the spectrum likelihood measure to produce a power spectrum weight value for an applicant;
   generating a composite risk score for the applicant by combining the power spectrum weight values with an actuarial model basis characteristic;
   determining a resultant insurance risk category based at least in part on the composite risk score; and
   providing an incentive to the applicant based at least in part on the resultant insurance risk category.

2. The computerized method of claim 1, further comprising:
   rank-ordering the values of the spectrum likelihood measure.

3. The computerized method of claim 1, further comprising:
   determining a distance between the values of the spectrum likelihood measure and one or more reference spectra; and
   selecting one or more reference spectra according to a classification criteria.

4. The computerized method of claim 1, further comprising:
   determining an entropy of the time series.

5. The computerized method of claim 1, the structured time series includes a predicted future time series.

6. The computerized method of claim 1, wherein determining values for the spectrum likelihood measure comprises identifying a first set of frequency terms that have a higher frequency than a second set of frequency terms.

7. The computerized method of claim 6, wherein the first set of frequency terms are discarded.

8. The computerized method of claim 1, wherein determining values for the spectrum likelihood measure comprises generating repeated random permutations.

9. The computerized method of claim 8, wherein determining values for the spectrum likelihood measure comprises sampling the resulting permutations utilizing a Bayesian Markov Chain Monte Carlo simulation.

10. The computerized method of claim 1, wherein determining values for the spectrum likelihood measure comprises:
    generating repeated random permutations; and
    sampling the resulting permutations utilizing a Bayesian Markov Chain Monte Carlo simulation.

11. A computerized method comprising:
    determining a time series for a set of applicant credit utilization data comprising a structured time series that is scaled based on a standard interval range;
    determining a frequency domain power spectrum based on the time series;
    determining rank-ordered values for a spectrum likelihood measure based at least in part on the frequency domain power spectrum the values determined using at least one of a wavelet transform, a discrete cosine transform, a discrete Fourier transform, a periodogram method, a Bartlett method, a Welsh method, or an autoregressive moving average estimate;
    scaling the values of the spectrum likelihood measure to produce a power spectrum weight value for an applicant;
    generating a composite risk score for the applicant by combining the power spectrum weight values with an actuarial model basis characteristic;
    determining a resultant insurance risk category based at least in part on the composite risk score; and storing the resultant insurance risk category in an operational data store.

12. The computerized method of claim 11, further comprising:
   determining a distance between the values of the spectrum likelihood measure and one or more reference spectra; and
   selecting one or more reference spectra according to a classification criteria.

13. The computerized method of claim 11, further comprising:
   determining an entropy of the time series or the structured time series.

14. The computerized method of claim 11, the structured time series includes a predicted future time series.

15. The computerized method of claim 11, wherein determining values for the spectrum likelihood measure comprises identifying a first set of frequency terms that have a higher frequency than a second set of frequency terms.

16. The computerized method of claim 15, wherein the first set of frequency terms are discarded.

17. A system comprising:
   at least one computer processor;
   computer memory coupled to the at least one processor comprising computer-executable instructions that when executed by the at least one processor perform operations comprising:
   determining a time series for a set of applicant credit utilization data comprising a structured time series that is scaled based on a standard interval range;
   determining a frequency domain power spectrum based on the time series;
   determining values for a spectrum likelihood measure based at least in part on the frequency domain power spectrum, the values determined using at least one of a wavelet transform, a discrete cosine transform, a discrete Fourier transform, a periodogram method, a Bartlett method, a Welsh method, or an autoregressive moving average estimate;
   scaling the values of the spectrum likelihood measure to produce a power spectrum weight value for an applicant;
   generating a composite risk score for the applicant by combining the power spectrum weight values with an actuarial model basis characteristic;
   determining a resultant insurance risk category based at least in part on the composite risk score; and
   providing an incentive to the applicant based at least in part on the resultant insurance risk category.

18. The system of claim 17, further comprising:
   determining an entropy of the time series.

19. The system of claim 17, wherein the structured time series includes a predicted future time series.

20. The system of claim 17, wherein determining values for the spectrum likelihood measure comprises identifying a first set of frequency terms that have a higher frequency than a second set of frequency terms.

* * * * *